US009657153B2

(12) United States Patent
Miyauchi et al.

(10) Patent No.: US 9,657,153 B2
(45) Date of Patent: May 23, 2017

(54) METHOD FOR PRODUCING A RESIN COMPOSITION HAVING A POROUS STRUCTURE WITH INDEPENDENT POROSITIES

(71) Applicant: CANON KABUSHIKI KAISHA, Tokyo (JP)

(72) Inventors: Yohei Miyauchi, Inagi (JP); Naotake Sato, Sagamihara (JP); Yuichi Hashimoto, Tokyo (JP); Toshihiro Kikuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/666,924

(22) Filed: Mar. 24, 2015

(65) Prior Publication Data

US 2015/0197616 A1 Jul. 16, 2015

Related U.S. Application Data

(60) Division of application No. 12/852,544, filed on Aug. 9, 2010, which is a continuation of application No. PCT/JP2010/059297, filed on May 26, 2010.

(30) Foreign Application Priority Data

May 28, 2009 (JP) ................................. 2009-129726

(51) Int. Cl.
| | | |
|---|---|---|
| *C08J 9/28* | (2006.01) | |
| *C08J 9/00* | (2006.01) | |
| *C08G 73/10* | (2006.01) | |
| *C08G 73/14* | (2006.01) | |
| *C08L 77/00* | (2006.01) | |
| *C08L 79/08* | (2006.01) | |
| *G03G 15/20* | (2006.01) | |
| *G03G 15/16* | (2006.01) | |
| *C08G 101/00* | (2006.01) | |

(52) U.S. Cl.
CPC ............. *C08J 9/286* (2013.01); *C08G 73/10* (2013.01); *C08G 73/1046* (2013.01); *C08G 73/14* (2013.01); *C08J 9/28* (2013.01); *C08L 77/00* (2013.01); *C08L 79/08* (2013.01); *G03G 15/162* (2013.01); *G03G 15/2057* (2013.01); *C08G 2101/00* (2013.01); *C08J 2201/054* (2013.01); *C08J 2205/044* (2013.01); *C08J 2205/052* (2013.01); *G03G 2215/1676* (2013.01)

(58) Field of Classification Search
USPC .......................................................... 521/64
See application file for complete search history.

(56) References Cited

U.S. PATENT DOCUMENTS

| | | | | | |
|---|---|---|---|---|---|
| 4,262,094 | A | * | 4/1981 | Johnson | ......................... 521/163 |
| 4,272,467 | A | * | 6/1981 | Johnson | ........................... 264/41 |
| 4,474,662 | A | * | 10/1984 | Makino | .................. B01D 71/64 |
| | | | | | 210/500.39 |
| 5,336,573 | A | * | 8/1994 | Zuckerbrod | ........ H01M 2/1666 |
| | | | | | 429/136 |
| 6,565,962 | B2 | | 5/2003 | Ohya et al. | |
| 6,761,790 | B2 | | 7/2004 | Kawashima et al. | |
| 6,861,012 | B2 | | 3/2005 | Gardner et al. | |
| 7,364,660 | B2 | | 4/2008 | Takai et al. | |
| 2005/0186479 | A1 | * | 8/2005 | Totsuka | ................ H01M 2/166 |
| | | | | | 429/251 |
| 2007/0003749 | A1 | | 1/2007 | Asgari | |
| 2007/0141286 | A1 | * | 6/2007 | Takase | .................. C08J 9/0023 |
| | | | | | 428/36.92 |

FOREIGN PATENT DOCUMENTS

| | | |
|---|---|---|
| CN | 101238166 A | 8/2008 |
| JP | 2001-089593 A | 4/2001 |
| JP | 2002-132070 A | 5/2002 |
| JP | 2002-347056 A | 12/2002 |
| JP | 2003-138057 A | 5/2003 |
| JP | 2006-133704 A | 5/2006 |
| JP | 2007-292849 A | 11/2007 |
| JP | 2007-298814 A | 11/2007 |
| JP | 2008-52201 A | 3/2008 |
| JP | 2009-073124 A | 4/2009 |
| WO | 2008/087559 A2 | 7/2008 |

OTHER PUBLICATIONS

International Preliminary Report on Patentability in PCT/JP2010/059297 (dated Apr. 2011).
Office Action in Chinese Application No. 201080023514.9 (dated Mar. 4, 2013).
Extended European Search Report in European Application No. 10780682.0 (dated Oct. 8, 2013).
Office Action in Japanese Application No. 2011-516088 (dispatched Feb. 27, 2014).
Thermal Resistance Definition. The Free Dictionary Online. 2012.
International Search Report in PCT/JP2010/059297 (dated Jul. 2010).

* cited by examiner

*Primary Examiner* — Kara Boyle
(74) *Attorney, Agent, or Firm* — Fitzpatrick, Cella, Harper & Scinto

(57) ABSTRACT

An object of the present invention is to provide a porous material (resin composition) having high heat insulation properties, mechanical properties, and electrical properties by controlling function of a porous film by setting a porosity size, distribution of the porosity size, and a porosity ratio of the porous film in predetermined ranges. The resin composition according to the present invention is comprised of an engineering plastic having porous structure in which not less than 80% of a total porosity is comprised of independent porosities, a mean porosity size is not less than 0.01 μm and not more than 0.9 μm, and not less than 80% of the total porosity has a porosity size within ±30% of the mean porosity size.

22 Claims, 8 Drawing Sheets

METHOD FOR PRODUCING A RESIN COMPOSITION HAVING A POROUS STRUCTURE WITH INDEPENDENT POROSITIES

CROSS-REFERENCE TO RELATED APPLICATIONS

This application is a division of application Ser. No. 12/852,544, filed Aug. 9, 2010, which is a continuation of International Application No. PCT/JP2010/059297, filed May 26, 2010, which claims the benefit of Japanese Patent Application No. 2009-129726, filed May 28, 2009.

BACKGROUND OF THE INVENTION

Field of the Invention

The present invention relates to an organic polymeric porous body used for insulating materials, lightweight structural materials, and absorption materials, acoustic absorbing materials, and catalyst carriers, substrates for electronic components having a low dielectric constant, and materials for aeronautics and astronautics and for transportation vehicles having heat insulation properties, acoustic absorption properties, and lightweight properties. The present invention also relates to a function member used for an image forming apparatus such as copying machines, printers, and facsimiles, and to an image fixing apparatus using the function member.

Description of the Related Art

An organic polymeric porous body is produced in a combination of various polymeric raw materials and a porosification technique, and manifests characteristic function thereof according to a porosity size, a porosity ratio, and surface properties. For example, foamed bodies such as foamed polystyrene and foamed polyurethane are used in broad fields such as houses, automobiles, and household appliances as lightweight structural materials, insulating materials, and shock absorbing materials. Porous films having a finer porosity size from nanometers to micrometers are also used as separation membranes, permeable membranes, separators for secondary cells, and hemodialysis membranes. Fields where the technique is used are increasing every year.

Recently, porous films are also developed particularly with respect to the so-called engineering plastics (hereinafter, engineering plastics), i.e., polymeric materials having thermal resistance against a temperature exceeding 200° C. Making use of properties such as high mechanical properties and chemical resistance, examples in which the engineering plastics are used also under environments with large chemical and physical load such as those of aerospace industry and transportation vehicles are increasing. A porous film using the engineering plastic resin can be used by making the porosity ratio high to some extent to enhance heat insulation properties. For this reason, development of various applications such as heat-resistant filters of high durability, low-k films for electronic component substrates, and insulating materials for aeronautic and astronautic rockets are considered.

Also in printing fields such as electrophotography and printers, there are many environments having exposure to a large amount of a solvent under high temperature and high pressure, for example, transfer or fixed portions of a toner and discharged portions of a dye in image forming apparatuses. In order to give advanced features to a material that forms these portions (for example, an intermediate transfer belt, an organic photoreceptor, a roller, and an ink head) to realize a new printing system, the necessary condition is use of a material that can bear the above-mentioned environments. Even in the present situation, polyimides are usually used for an intermediate transfer belt in an electrophotographic apparatus.

Porosification of a resin is a very effective method upon giving advanced features to the material as mentioned above. On the other hand, for the above reason, use of an engineering plastic porous film is very effective upon applying a porosified material to the printing field to develop a new printing method with energy saving, a high speed, and high image quality. In the present situation, examination is conducted as shown in Patent Documents.

Various methods such as an electrophotographic method, an electrostatic recording method, an inkjet method, and a thermal recording method are used as a printing method for the image forming apparatus at present. Of these methods, the electrophotographic method is a method widely spread mainly in offices for advantages such that operation of the apparatus is easy, a large amount of recorded images can be printed in a short time, and recorded matters have small deterioration over time and high preservability.

The electrophotographic image forming apparatus includes a charging apparatus that charges a photoreceptor, an exposing apparatus that irradiates the charged photosensitive body surface with a laser beam to form an electrostatic latent image, a developing apparatus that forms a toner image from the electrostatic latent image on the surface of the photoreceptor, a transfer apparatus that transfers the toner image on the surface of the photoreceptor onto a recording medium, a fixing apparatus that fixes the toner image transferred on the recording medium to the recording medium, and a cleaning apparatus that removes a toner that remains on the surface of the photoreceptor after transfer of the toner image, for example.

Examples of a main method for fixing the toner image on the recording medium include a method in which a heat fixing roller and a pressurizing roller parallel to and in pressure contact with this heat fixing roller are provided, and a recording medium having a toner image attached thereto is passed between the pressurizing roller and the heat fixing roller; thereby, the toner is softened with heat of the heat fixing roller, and the toner image is fixed on the recording medium by applying pressure between the pressurizing roller and the heat fixing roller.

In such a heat fixing apparatus, a heat fixing roller having a releasing layer made of a fluororesin for prevention of toner adhesion provided on an outer circumferential surface of a core bar composed of a hollow cylindrical body made of aluminum is used, for example. A halogen lamp or a heat source of an induction electromagnetic heating method is disposed in a hollow portion of the core bar of the heat fixing roller, and the heat fixing roller is heated from the inside thereof by the radiant heat or induction heating.

For the electrophotographic image fixing apparatus, a belt nip method including a heating roller having a heating source, a belt that contacts the heating roller by pressure and rotates with the heating roller, and a fixing roller arranged within this belt is known. Moreover, a method in which a belt is contacted by pressure with a heating roller by a pressure pad (hereinafter, referred to as a "heat roller fixing method") is also known.

The heat roller fixing method is suitable for higher-speed printing and mass printing because the entire heating roller can be kept at a predetermined temperature. However, the heat roller fixing method has problems such that rise time of the heating roller reaching the predetermined temperature is longer, and power consumption is larger. Particularly, approximately 80% of heat transfer from the heating roller dissipates to the recording medium or the outside of the system. For this reason, a problem of significant increase in power consumption arises in high-speed printing.

Then, methods for providing a porous layer in a belt material have been proposed. Japanese Patent Application Laid-Open No. 2006-133704 has proposed suppression of increase in a surface temperature of a photoreceptor by providing a porous layer in a belt material that serves both as an intermediate transfer body and a fixing body. Moreover, Japanese Patent Application Laid-Open No. 2008-52201 has proposed a belt material having a porous layer as a belt material with high elasticity and high heat resistance. Porous polyimide described in Japanese Patent Application Laid-Open No. 2003-138057 and a porous engineering plastic material having independent porosities described in Japanese Patent Application Laid-Open No. 2009-073124 are proposed as a method for producing a porous layer having fine porosities.

SUMMARY OF THE INVENTION

However, the porous film usually has poor mechanical strength for voids in the film. For that reason, in spite of excellent functions such as high heat insulation properties, low dielectric constant, and high absorptivity of the porous film, the film has poor mechanical resistance and impact resistance, and has limitation in members to which the film can be applied and in application of the film. For example, in the method described in Japanese Patent Application Laid-Open No. 2003-138057, the porous film is composed of continuous porosities, and it is very difficult to improve mechanical strength of the film. Moreover, in the method described in Japanese Patent Application Laid-Open No. 2009-073124, a treatment for improving communicating properties of the porous layer by keeping the porous layer under humidification is performed before phase conversion. For this reason, it is difficult to produce a porous film having a mean porosity size in submicrons (less than 1 µm). As the porous film disclosed in the embodiment, only a porous film having a relatively large mean porosity size of 1.0 to 4.0 µm is disclosed. Further, when the above-mentioned treatment is conducted, fluctuation in the porosity size of the independent porosity cannot be suppressed. Namely, the film disclosed there has problems in film properties, particularly in thermal conductivity after compression, and it cannot be said that the film has a film structure suitable for application to a belt material as described in Japanese Patent Application Laid-Open No. 2006-133704.

Moreover, a porous film produced by a porosifying method described in Japanese Patent Application Laid-Open No. 2006-133704 has macro voids and continuous porosities because a porosity form is not controlled. For that reason, mechanical strength is poor and there is no resistance against deformation or compression, causing deterioration of the material during printing. Accordingly, it is difficult to use the porous film as a belt material for mass printing or for high-speed printing.

In Japanese Patent Application Laid-Open No. 2008-52201, because a porous film is produced by a foaming method, uniform control of the porosity size is difficult, the porous film has a very large porosity size and the continuous porosities. For that reason, mechanical strength of the film is poor and deterioration of the material during continuous printing cannot be suppressed, causing gradual reduction in a modulus of elasticity and increase in thermal conductivity. Accordingly, it is difficult to use the porous film as a belt material for power-saving fixing.

Then, an object of the present invention is to solve the above-mentioned problems. Namely, an object of the present invention is to provide a porous material (resin composition) having high heat insulation properties, mechanical properties, and electrical properties by controlling function of a porous film by setting a porosity size of the porous film, distribution of the porosity size, and a porosity ratio in predetermined ranges. Other object of the present invention is to provide an image fixing apparatus of power saving and/or for high-speed printing by suppressing thermal diffusion from a toner by use of the porous material as an electrophotographic belt member.

The resin composition according to the present invention is comprised of an engineering plastic having porous structure in which not less than 80% of a total porosity is comprised of independent porosities, a mean porosity size is not less than 0.01 µm and not more than 0.9 µm, and not less than 80% of the total porosity has a porosity size within ±30% of the mean porosity size. Moreover, in the image fixing apparatus according to the present invention, a lamination film according to the present invention having a releasing layer or a substrate on at least one surface of the resin composition is used for an electrophotographic transfer member, a fixing member, or a member for transfer and fixing.

According to the present invention, in the porous structure of the resin composition composed of the engineering plastic, function of the resin composition is controlled by setting the porosity size of the independent porosity and distribution thereof in the ranges of the present invention, and a composite porous material having high heat insulation properties and mechanical properties can be provided. A material having high mechanical properties can be provided particularly because not less than 80% of the total porosity in the porous structure is composed of the independent porosities. Moreover, by using the porous material (resin composition) according to the present invention as a function member for electrophotography, a material having high heat insulation properties, mechanical properties, and electrical properties needed for transfer of the toner can be provided. As a result, an image fixing apparatus that is power saving and allows high-speed printing and mass printing can be provided.

Further features of the present invention will become apparent from the following description of exemplary embodiments with reference to the attached drawings.

DESCRIPTION OF THE EMBODIMENTS

Figure 1:
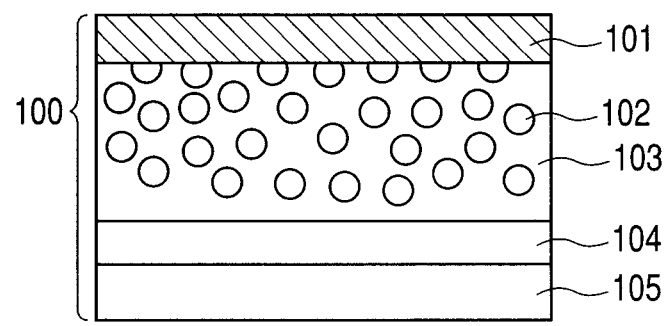
FIG. 1 is a schematic configuration diagram illustrating an example of a laminating state of a lamination film according to the present invention.

In order to describe the present invention in detail, embodiments for implementing the invention will be shown below using the drawing. The embodiments individually disclosed are an example of actual usage of a resin composition as the present invention, a lamination film containing the resin composition, and an image forming apparatus that uses the lamination film as a component, but the present invention will not be limited to these.

(Embodiments of the Present Invention)

FIG. 1 schematically illustrates a cross section of a lamination film including a resin composition, a releasing layer and an elastic layer and a substrate formed thereon, in the present embodiment.

From a viewpoint of mechanical properties, the porous structure of the resin composition in the present embodiment includes independent porosities whose spaces are separated by a resin wall of a curved surface. The porosities are independent of each other, and each have a wall made of a resin between the porosities. For that reason, it is expected that the entire resin composition will manifest a modulus of elasticity higher than that of a continuous porosity because of not only the modulus of elasticity of the resin but also an effect of gas pressure in the porosity. Formation of the independent porosities can reduce invasion of impurities produced in an image formation process into a porous layer, and can suppress manifestation of deterioration of the material and change in physical properties. Moreover, in the porous structure according to the present embodiment, the independent porosities occupy not less than 80% of the total porosity. Here, the "independent porosity" means a porosity in which the wall of the resin existing between the porosity and an adjacent porosity has no opening hole.

The porosity size of the resin composition in the present embodiment is properly selected in the range of not less than 0.01 μm and not more than 0.9 μm. Form a viewpoint of heat insulation properties, the porosity size is preferably not more than a mean free path of air. At a porosity size of not more than the mean free path (65 nm in the case of the air), the thermal conductivity of the air included in the porosity is reduced, and the porosity can be regarded as vacuum. For that reason, the thermal conductivity is reduced as the entire the resin composition, and improvement in heat insulation properties can be expected. However, at a porosity size smaller than 0.01 μm, the configuration is similar to a nonporous film, and therefore propagation by heat conduction in the porosities through the resin wall is increased. For that reason, the thermal conductivity is increased as the entire resin composition, making it difficult to use the resin composition as a heat insulating material. Moreover, the porosity size can be controlled by a viscosity of a solution as described later. However, in the case where it is going to realize a porosity size of not more than 0.01 μm, the viscosity of the solution is very high, leading to difficulties in handling in film production.

The porous structure of the resin composition according to the present invention also has a structure including no macro void having a porosity size of not less than 10 μm. This is because when the macro voids are increased, the material easily deteriorates due to external physical change such as compression and tension. Preferably, no macro void is included for a relationship with a conductive controlling agent, as described later. Further, in the present invention, the mean porosity size of the resin composition is within the range of not less than 0.1 μm and not more than 0.9 μm. A method for measuring a porosity size in the present embodiment is not particularly limited. The conventional measuring method can be used, and mercury porosimetry and image analysis after SEM observation can be used.

Further, in the present invention, not less than 80% of the total porosity includes a porosity size within ±30% of the mean porosity size in the above-mentioned range.

The porosity size is kept uniform, an external stress can be dispersed, and it is less likely to produce deterioration of the film or cracks by concentration of stress because not less than 80% of the total porosity includes a porosity size within ±30% of the mean porosity size. Moreover, in the case where a material such as a filler is dispersed in the film, a uniform dispersion state is obtained and desired properties are easily manifested.

The porosity ratio in the resin composition is from not less than 10% and not more than 90%, and particularly preferably from not less than 30% and not more than 70%. At an excessively low porosity ratio, reduction in the thermal conductivity is suppressed so that heat insulation properties cannot be manifested. At an excessively high porosity ratio, the film having poor mechanical strength is obtained, making it difficult to use the film as an electrophotographic belt member. A method for measuring a porosity ratio in the present embodiment is not particularly limited. For example, the porosity ratio can be calculated with a density measurement method.

The thermal conductivity of the porous layer can be reduced by properly determining the porosity size and the porosity ratio. For example, in the case of a polyimide material, the thermal conductivity of a nonporous film is approximately from 0.2 to 0.3 [W/mK]. On the other hand, the thermal conductivity can be reduced to approximately 0.03 to 0.1 [W/mK] by providing the porosities of the present invention, which have the independent porosities that occupy not less than 80% of the total porosity.

The engineering plastic used for the present invention is a functional resin having a heat-resistant temperature of not less than 110° C. Here, the heat-resistant temperature refers to a temperature at which the resin can be continuously used without deforming nor deteriorating, for example, refers to a glass transition temperature.

The resin composition including the engineering plastic used for the present invention includes a resin composition selected from the group consisting of polyimides, polyamidoimides, polyamides, polyether imides, polysulfones, polyether sulfones, polycarbonates, and polyether ether ketones or a combination thereof. These resin compositions are a material having high thermal resistance, mechanical properties, and solvent resistance.

The present inventors considered an optimal configuration in case of using these materials as a transfer member or a fixing belt member for the electrophotographic image forming apparatus. As a result, it was found out that the porous structure in the range of the present invention can suppress deterioration of the material and change in physical properties in thermal and chemical environments to which the porous structure is exposed, and a film with high mechanical strength can be attained even if the porosity ratio is set to be high in order to improve heat insulation properties. Of these, thermosetting polyimides can be use suitably from a viewpoint of operability of the porosification method, control of the porosity form, thermal resistance, and mechanical strength.

Hereinafter, a method for producing a resin composition according to the present invention will be described in detail.

A method for producing a resin composition according to the present invention is a method for producing a resin composition having a porous structure in which not less than 80% of the total porosity includes the independent porosities. The method also includes molding an engineering plastic resin solution having a viscosity of not less than 10,000 cP and not more than 1,000,000 cP, and removing a solvent of the resin solution with a phase separation method to perform porosification.

Production of the resin composition is preferably conducted using a phase separation method. A solution (resin solution) of a resin such as polyamic acid serving as a raw material is molded on a substrate. Subsequently, the substrate is immersed in a solidifying solvent to be porosified. A molded shape can be selected properly, and a method for cast molding a resin solution into a shape of a film is preferable. The state of the film changes (phase transition) by immersing the substrate in the solidifying solvent. This method is referred to as the phase separation method. Phase transition here means that a resin deposits as a solid by immersing a solution system in a solidifying solvent (poor solvent).

When polyamic acid is used for the resin solution, a porous polyimide film can be obtained by further imidizing the resin after this porosification.

Upon production of the porous film with the above-mentioned method, the porous film is preferably produced with the phase separation method by using the resin solution having a viscosity of not less than 10,000 cP and not more than 1,000,000 cP, and more preferably not less than 30,000 cP and not more than 500,000 cP. A resin having a low viscosity cannot suppress growth of the macro voids. Conversely, a resin having a high viscosity cannot be casted on the substrate with the casting method. Accordingly, film production is difficult.

The viscosity of the solution can be increased or controlled by adding an inorganic salt to the resin solution.

Here, as the inorganic salt, lithium chloride, lithium bromide, lithium oxalate and the like, are used suitably. Addition of the inorganic salt can improve the viscosity of the resin solution, and can suppress growth of the macro voids produced at the time of phase transition.

The resin composition without macro voids can be obtained also by adjusting a solvent substitution rate.

As a method, a cast film can be covered with a solvent substitution rate adjustment film to be immersed in the solidifying solvent, for example. Alternatively, without using the above-mentioned film, phase transition is conducted by adding the solvent used to dissolve the resin to the solidifying solvent, or by changing the temperature of the solidifying solvent, thereby, the solvent substitution rate can be changed so that the same effect as that of a solvent substitution adjustment material can be manifested.

Here, a sheet-shape polymeric material having constant porosities is used as a solvent substitution adjustment film. Specifically, nonwoven fabrics and resin compositions including polyolefines, celluloses, and fluororesins are used suitably. Upon phase transition, by covering the cast film with the above-mentioned film, the substitution rate of the solvent of the resin solution and the solidifying solvent can be adjusted to obtain the resin composition having a uniform porosity size without macro voids.

Moreover, the porosity size of the porous film can be controlled by changing the solidifying rate of the resin. Specifically, the porosity size can be reduced by making the solidifying rate faster, and the porosity size can be increased by making the solidifying rate slower. Accordingly, the porosity size can be properly controlled by changing the solidifying rate using the viscosity of the resin or the solvent substitution adjustment material.

As a parameter to control the solidifying rate, a Gurley value of a sheet having porosities or the temperature of the solidifying solvent can be used, for example. Preferably, a value represented by a product of the Gurley value and the resin viscosity can be used as a factor that controls a porosity structure of the porous film. Examples of the solidifying solvent include water, alcohols (e.g., methanol, ethanol, propanol), hydrocarbons (e.g., hexane, cyclohexane, heptane), ketones (e.g., acetone, butanone, 2-butanone), and esters (e.g., ethyl acetate). Water is preferable from a viewpoint of simple operation and cost.

Here, the porosity structure of the porous film can be controlled by controlling a phase separation state of the polymer solution at the time of phase transition. Specifically, the phase separation state can be controlled into a sea-island type or a spinodal type by properly changing the viscosity of the polymer solution, the concentration of the resin, and the solvent. By reflecting the phase separation state, the porous structure of the porous film can be changed. Also in the present invention, the phase separation structure can be controlled to produce the resin composition in which the independent porosities occupy not less than 80% of the total porosity.

Polyamic acid can be imidized by a thermal imidization treatment or a chemical imidization treatment using such as acid anhydride. Thermal imidization is suitably used for simple operation. It is known that mechanical strength of the polyimide film greatly changes depending on heat treatment conditions. In the heat treatment in the present invention, the temperature may be increased at a constant rate, and preferably the heating temperature is increased stepwise. Specifically, the temperature can be increased for example, for 10 to 60 minutes from 80° C. to 120° C., for 10 to 60 minutes from 120 to 200° C., and for 10 to 60 minutes from 200 to 350° C.

The porosity ratio can be controlled by adjusting the concentration of the resin in the resin solution. The porosity ratio can be properly reduced by increasing the concentration of the resin and reducing the concentration of the solvent in the solution. On the other hand, the porosity ratio can be properly increased by reducing the concentration of the resin and increasing the concentration of the solvent in the solution.

A conductive controlling agent can be added to the porous layer when necessary to adjust resistance. As a method, a predetermined amount of the conductive controlling agent can be added to the resin solution and dispersed. Using the resin solution, the resistance is adjusted with the phase separation method.

Dispersion can be conducted with a dispersing machine usually used. Specifically, a roll mill, a paint shaker, a bead mill and the like can be used.

As the conductive controlling agent, substances usually used in this field can be used. For example, carbon black such as furnace black, thermal black, channel black, graphite, carbon nanotube, and the like can be used. Metal oxides such as tin oxide, antimony oxide, indium oxide, zinc oxide, indium zinc based oxides, and the like, and metals such as gold, silver, copper, nickel, and the like can also be used. Further, a conductive material may be formed by covering the surface of various inorganic substances (e.g., titanic acid based compounds such as potassium titanate, titanium dioxide, monoclinic titanium dioxide, and the like, calcium silicate such as wollastonite, xonotlite, and the like, amorphous silica, etc.) with the above-mentioned material.

An ionic conducting agent such as quarternary ammonium salts, phosphoric esters, sulfonic acid salts, aliphatic polyhydric alcohols, and aliphatic alcohol sulfate salts can also be used.

Of these, carbon black and metal oxide are preferable, and carbon black is particularly preferable. One kind of the conductive controlling agent can be used alone, or not less than two kinds thereof can be used in combination.

Also from a viewpoint of control of the resistance, the porous structure without macro voids is preferable. Electric conduction is manifested when the conductive controlling agents approach each other. However, the conductive controlling agents are physically isolated if a porosity much larger than the particle size of the conductive controlling agent exists. Existence of such a large porosity causes a remarkably nonuniform dispersion state, leading to unstable control of conductivity. A uniform porosity size is also preferable. Such a uniform porosity size leads to uniform dispersion of the conductive controlling agent, and control of the conductivity can be performed with good repeatability.

The amount of the conductive controlling agent is determined properly such that 1 to 30% by weight of the above-mentioned conductive controlling agent is contained, and the volume resistivity of the porous layer is approximately $10^7$ to $10^{10}$ Ωcm. Thereby, the toner can be efficiently transferred from the photoreceptor drum onto the belt. The conductivity cannot be manifested at a conductive controlling agent of not more than 1% by weight. Moreover, at a conductive controlling agent of not less than 30% by weight, an influence of the viscosity makes it difficult to realize uniform dispersion using a dispersing machine.

Additionally, it is usually known that addition of the conductive controlling agent significantly increases the thermal conductivity. In the present invention, however, the thermal conductivity can be suppressed to be not more than 0.10 [W/mK] when the porosity ratio is at least 30% or larger even in the resin composition to which the conductive controlling agent is added to control the resistance. Heat is transmitted by free electrons of the conductive controlling agent in the polymeric material. On the other hand, in the porous body that includes a large amount of porosities per unit volume, increase in the thermal conductivity can be suppressed to be a value of not more than a constant value.

In the present invention, the resin composition can have a structure in which on at least one surface of the resin composition, a releasing layer or a substrate is laminated, and an elastic layer is further laminated when necessary (see FIG. 1). For example, the releasing layer can be laminated on the one surface of the resin composition and used.

As the releasing layer 101, a fluororesin is used suitably. The kind of the fluororesin is not particularly limited. Examples of the fluororesin include polytetrafluoroethylene (PTFE), tetrafluoroethylene-perfluoroalkyl vinyl ether copolymers (PFA), and tetrafluoroethylene-ethylenic copolymers (ETFE). The releasing layer 101 made of a fluororesin or a resin mainly containing the fluororesin can prevent a molten toner from adhering to the fixing belt so that a high-quality fixed image can be obtained.

The releasing layer 101 (for example, a fluororesin layer) has a thickness of not less than 1 μm and not more than 10 μm, and particularly preferably not less than 3 μm and not more than 7 μm. An excessively small thickness of the lamination film 100 containing the resin composition 103 makes mechanical strength poor so that the material is likely to deteriorate due to cracks or scraping. Moreover, an excessively large thickness of the lamination film 100 increases the heat capacity of a surface layer so that thermal diffusion from the toner easily occurs. For this reason, it is impossible to heat only the toner efficiently.

A conductive controlling agent can also be added to the releasing layer 101 when necessary. As the conductive controlling agent, the same conductive controlling agent as that added to the resin composition 103 can be added. Moreover, similarly to the case of the resin composition 103, the content of the conductive controlling agent is determined so that the volume resistivity may be in the range of $10^7$ to $10^{11}$ Ωcm.

Of the surfaces of the resin composition 103, the substrate 105 can be laminated on the surface having no releasing layer 101. The substrate 105 can be laminated by casting the resin solution on the substrate 105 and porosifying the resin solution in the phase separation method.

At this time, in order to improve adhesion of the substrate 105 to the resin composition 103, the same resin as the porosified resin or a material having a chemical structure having affinity with the porosified resin is preferably used for the substrate 105. Further, the surface of the substrate 105 may be physically or chemically roughened to improve adhesion by an anchor effect.

Moreover, the elastic layer 104 can be laminated between the resin composition 103 and the substrate 105 when necessary. As the elastic layer 104, heat-resistant silicone rubber, fluororubber, or mixture mainly containing these can be used suitably.

In the resin composition of the present invention, the application and shape thereof can be properly selected according to the function. When a resin composition of polyimide is taken, for example, since the resin composition of polyimide has high heat resistance, low dielectric constant, chemical resistance, and high mechanical strength, the resin composition of polyimide can be used as an electrolyte membrane for fuel cells or a supporting substrate for an electronic material, and can also be used for a heatproof filter or a lightweight member for automobiles. The resin composition preferably has a belt-like shape particularly in the case where the resin composition is used for the fixing member for electrophotography as an insulating member. The resin composition is formed on a tubular or cylindrical substrate, and can be used as the fixing roller as it is.

Particularly because the resin composition of the present invention has independent porosities 102 of a small porosity size, the resin composition of the present invention can be used as an insulating member that can suppress reduction of mechanical strength accompanied by porosification. The lamination film containing the resin composition of the present invention also has resistance against physical deformation applied to the material and exposure to chemical substances at the time of mass printing. Accordingly, the lamination film containing the resin composition of the present invention can be used as the electrophotographic transfer member, the fixing member, the member for transfer and fixing in the image fixing apparatus (system) that performs mass printing and/or high-speed printing.

Figure 2:
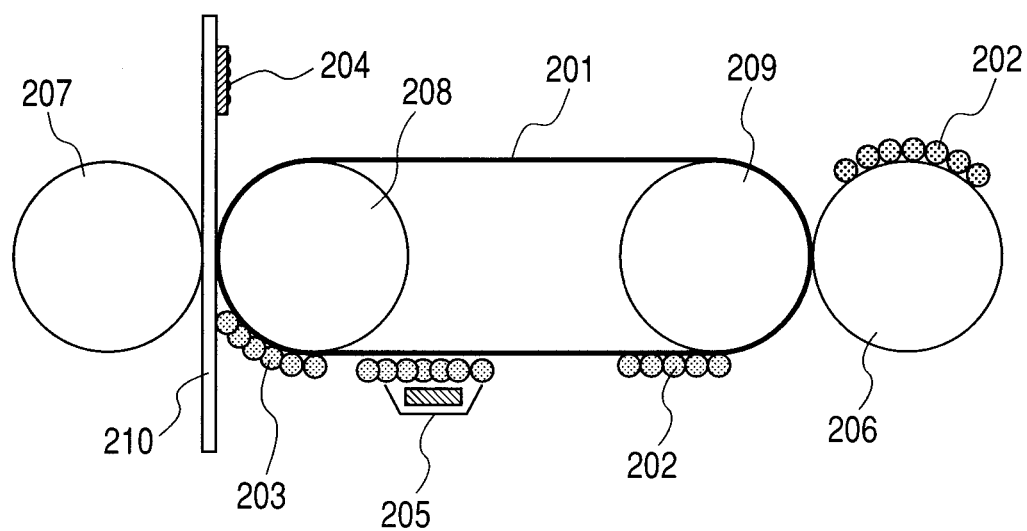
FIG. 2 is a schematic configuration diagram illustrating an example of a fixing apparatus including an electrophotographic fixing member according to the present invention.
Figure 3:
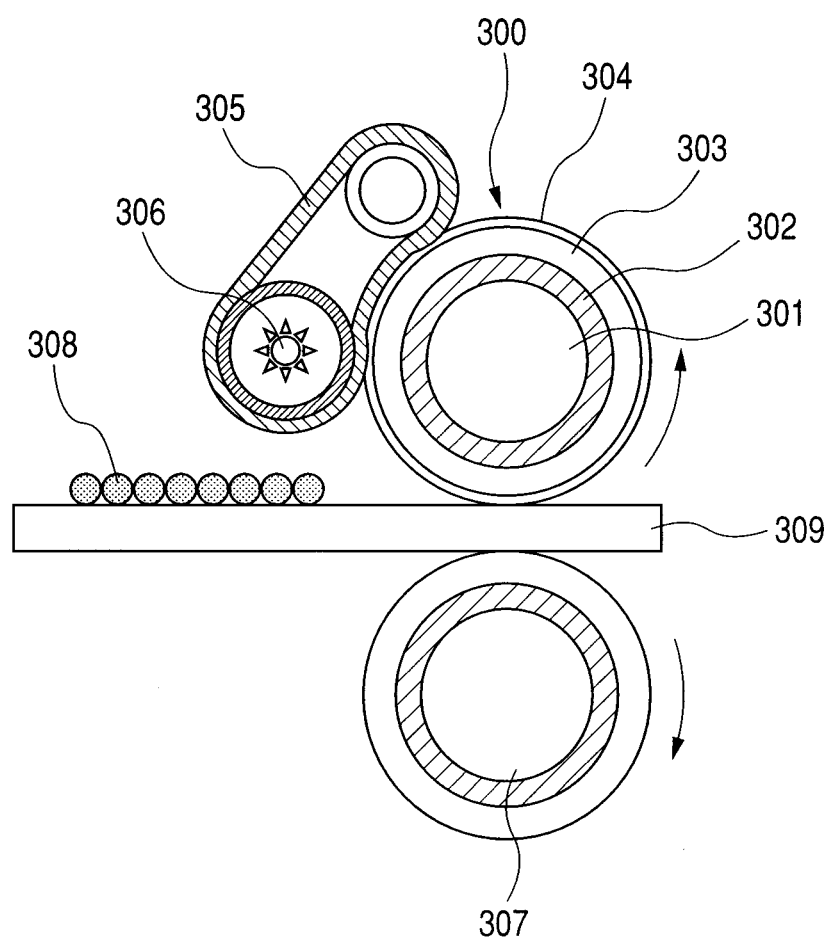
FIG. 3 is a schematic configuration diagram illustrating an example of the fixing apparatus including the electrophotographic fixing member according to the present invention.

For example, the lamination film containing the resin composition of the present invention can be used for an image fixing apparatus having a simultaneous transfer and fixing system as illustrated in FIG. 2, or can be used for an image fixing apparatus having a fixing system as illustrated in FIG. 3. The fixing systems illustrated in FIG. 2 and FIG. 3 are a fixing system that heats the toner from the releasing layer side with an external heating source. Because the lower portion of the toner has an insulating layer, diffusion of the heat energy from the toner to the outside of the system can be suppressed so that reduction in the temperature of the toner during conveyance can be suppressed. Only the toner may be heated in this system. For this reason, it is possible to suppress thermal diffusion to paper and so on that has occurred conventionally, and to fix the toner with small electric power energy.

Moreover, in the present invention, toner transfer from a photoreceptor drum 206 can also be conducted because the resin composition 103 whose resistance is controlled is used. Transfer and fixing can be conducted with one belt material in the simultaneous transfer and fixing system, leading to space saving and reduction in cost.

Hereinafter, an example of the fixing apparatus including a member for electrophotographic transfer and fixing in the present invention will be illustrated, but the fixing apparatus will not be limited to this.

The apparatus illustrated in FIG. 2 has a belt member in the present invention, and includes an external heating source 205, the photoreceptor drum 206, a pressurizing roller 207, a driving roller 208, and a charging roller 209. A toner 202 is transferred from the photoreceptor drum 206, and a fixing belt 201 in the present invention contacts the pressurizing roller 207 by pressure to form a nip portion. While the temperature of the toner is kept, the toner 202 heated by the external heating source 205 becomes molten (molten toner 203). Then, the molten toner 203 travels to the nip portion, is fixed on a recording medium 210, and turns into a fixed toner 204.

The apparatus illustrated in FIG. 3 has a fixing roller 300 in which a resin composition 303, a substrate 301, an elastic layer 302, and a releasing layer 304 according to the present invention are used, and includes an external heating source 306, a pressurizing roller 307, and a fixing belt 305. Similarly to the system illustrated in FIG. 2, a toner 308 molten by the external heating source 306 travels to the nip portion in a molten state while the temperature of the toner 308 is kept, and is fixed onto a recording medium 309.

In addition, the porous film in the present invention can be used not only for the belt material but also for resin members at large such as organic photoreceptors and frames in the electrophotography field.

Moreover, besides the electrophotography field, the porous film in the present invention can also be used for a covering material for electronic components and electric wire as a low dielectric constant material having high mechanical strength, or for structure members for transportation vehicles or aerospace industry and building materials as a lighter weight material or a heat insulating material. The porous film in the present invention can be potentially applied to processed components at large in which a heat resistant resin is used.

EXAMPLES

Hereinafter, the present invention will be described in detail using Examples, but the present invention will not be limited to these.

A porosity ratio is calculated in accordance with the following equation by measuring the thickness and weight of a porosity film cut into a 3 cm square. S designates an area of the porosity film, d designates the thickness thereof, w designates the weight of the porosity film, and D designates the density of polyimide.

$$\text{Porosity ratio (\%)} = (D/w) - (S - d) - 100$$

Porosity size distribution (the size of a small porosity size and number distribution) and the ratio of independent porosities is calculated by using an image processing system (LUZEX AP, Nireco Corporation) based on an image obtained by observing the cross section of a porosity polyimide resin layer with a scanning electron microscope (SEM).

A thermal conductivity is calculated by measuring a thermal diffusivity with a thermal diffusivity meter (FTC-1, Ulvac-Riko, Inc.) and integrating a density and a specific heat separately determined with the thermal diffusivity.

With respect to polyimides and polyamide imide resins, a compression resistance is calculated from a ratio of thickness change before and after compression by compressing polyimide or a polyamide imide resin using a high precision hotpress (Tester Sangyo Co., Ltd.) under conditions of a pressure of 7 kgf/cm$^2$, a compression temperature of 170° C., and a compression time of 4 hours. Moreover, with respect to polycarbonate resins, a compression resistance is calculated from a ratio of thickness change before and after compression by compressing a polycarbonate resin using a high precision hotpress (Tester Sangyo Co., Ltd.) under conditions of a pressure of 7 kgf/cm$^2$, a treatment temperature of 70° C., and a compression time of 4 hours.

An average surface roughness (Rz) is evaluated using a surface roughness measuring apparatus (SURF-CORDER SE3500, Kosaka Laboratory Ltd.).

A viscosity is evaluated using a viscometer (a cone-and-plate rheometer MCR-300, Anton Paar GmbH).

A surface resistance is evaluated using a sample box for super high resistance measurement (TR42, Advantest Corporation).

A dielectric constant is evaluated with an LCR meter (HP4284A, Yokogawa-Hewlett-Packard Ltd.).

Example 1

An N-methyl-pyrrolidone (NMP) solution (U-varnish-A, Ube Industries, Ltd., resin concentration of 20% by weight) of polyamic acid that is a polyimide precursor was prepared. Lithium chloride was added to the polyamic acid solution so that the concentration of lithium chloride might be 15% by weight, and was dissolved. The resin viscosity at this time was 120,000 cP. A polyimide material (Kapton, Du Pont-Toray Co., Ltd.) having a thickness of 120 μm was prepared as a substrate, and the above-mentioned solution was casted on the substrate using a coater. Subsequently, the cast film was immersed in distilled water at room temperature for 5 minutes. The substrate was taken out from the water, and the obtained film was rinsed with distilled water.

Adhering water was wiped off, and the film was put into a drying furnace. The film was dried at 80° C. for 1 hour. Subsequently, the temperature was raised to 150° C. at a heating rate of 10° C./min. After the film was heated at 150° C. for 30 minutes, the temperature was raised to 250° C. at a heating rate of 10° C./min. After the film was heated at 250° C. for 10 minutes, the temperature was raised to 350° C. at a heating rate of 10° C./min. Then, the film was heated at 350° C. for 10 minutes to produce a polyimide resin composition.

Figure 4:
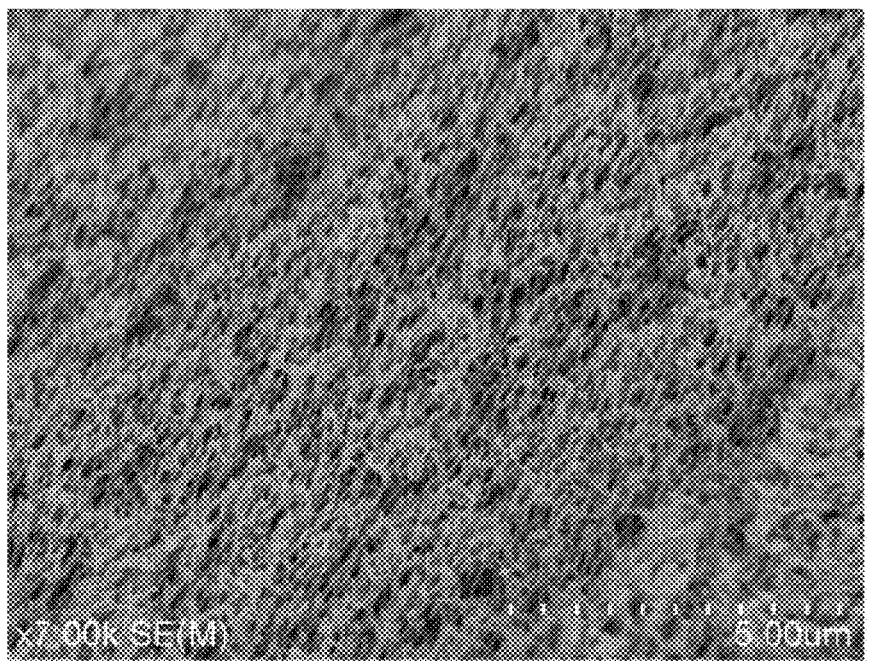
FIG. 4 is a sectional view of a resin composition in Example 1.

The porosity form of the obtained film was examined. The mean porosity size thereof was 0.015 μm. The number distribution was examined. Then, 81% of the total porosity was included in a size of 0.011 to 0.019 μm. Moreover, the porosity ratio was measured. The porosity ratio was 65%, and the thickness of the obtained porous film was 180 μm. The cross section of the film was observed with the SEM. Then, the cross section had that illustrated in FIG. 4 (7,000-fold), and 90% of the total porosity was the independent porosity.

The properties of the porous film at the time of drying were examined. Then, the mean porosity size at the time of drying at 80° C. for 1 hour was 0.020 μm. The number distribution was examined. Then, 82% of the total porosity was included in a size of 0.014 to 0.026 μm. Moreover, the porosity ratio was measured. Then, the porosity ratio was 69%, and the thickness of the obtained porous film was 190 μm. Moreover, the physical properties of the film when the film was heated at 250° C. for 10 minutes were examined. Then, the mean porosity size was 0.019 μm. The number distribution was examined. Then, 83% of the total porosity was included in a size of 0.0133 to 0.0247 μm. Moreover, the porosity ratio was measured. Then, the porosity ratio was 68%, and the thickness of the obtained porous film was 188 μm.

Example 2

Example 2 was conducted by the same method as that in Example 1 except that the amount of lithium chloride was adjusted so that the resin viscosity of polyamic acid was 108,000 cP.

The mean porosity size of the independent porosity was 0.055 μm. The number distribution was examined. Then, 82% of the total porosity was included in a size of 0.040 to 0.070 μm. Moreover, the porosity ratio was 64%, and 81% of the total porosity was the independent porosity. The thickness of the obtained porous film was 150 μm.

Example 3

Example 3 was conducted by the same method as that in Example 1 except that the amount of lithium chloride was adjusted so that the resin viscosity of polyamic acid was 96,000 cP.

The mean porosity size of the independent porosity was 0.10 μm. The number distribution was examined. Then, 82% of the total porosity was included in a size of 0.070 to 0.13 μm. Moreover, the porosity ratio was 61%, and 80% of the total porosity was the independent porosity. The thickness of the obtained porous film was 125 μm.

Example 4

A polyimide resin composition was produced by the same method as that in Example 1 except that the amount of lithium chloride was adjusted so that the resin viscosity of polyamic acid was 78,000 cP.

The mean porosity size of the independent porosity was 0.20 μm. The number distribution was examined. Then, 83% of the total porosity was included in a size of 0.17 to 0.26 μm. Moreover, the porosity ratio was 62%, and 81% of the total porosity was the independent porosity. The thickness of the obtained porous film was 130 μm.

Example 5

A polyimide resin composition was produced by the same method as that in Example 1 except that the cast film casted on the substrate was covered with a solvent substitution adjustment material (U-Pore, a Gurley value of 210 sec/100 cc, Ube Industries, Ltd.), and was subjected to phase transition. The resin viscosity was 118,000 cP.

The mean porosity size of the independent porosity was 0.20 μm. The number distribution was examined. Then, 94% of the total porosity was included in a size of 0.17 to 0.26 μm. Moreover, the porosity ratio was 63%, and 94% of the total porosity was the independent porosity. The thickness of the obtained porous film was 160 μm.

Example 6

Example 6 was conducted by the same method as that in Example 1 except that the amount of lithium chloride was adjusted so that the resin viscosity of polyamic acid was 69,000 cP.

The mean porosity size of the independent porosity was 0.40 μm. The number distribution was examined. Then, 82% of the total porosity was included in a size of 0.28 to 0.52 μm. Moreover, the porosity ratio was 64%, and 82% of the total porosity was the independent porosity. The thickness of the obtained porous film was 140 μm.

Example 7

A polyimide resin composition was produced by the same method as that in Example 5 except that the amount of lithium chloride was adjusted so that the resin viscosity of the polyamic acid solution was 105,000 cP, and the cast film casted on the substrate was covered with a solvent substitution adjustment material (U-Pore, a Gurley value of 300 sec/100 cc, Ube Industries, Ltd.), and was subjected to phase transition.

Figure 5:
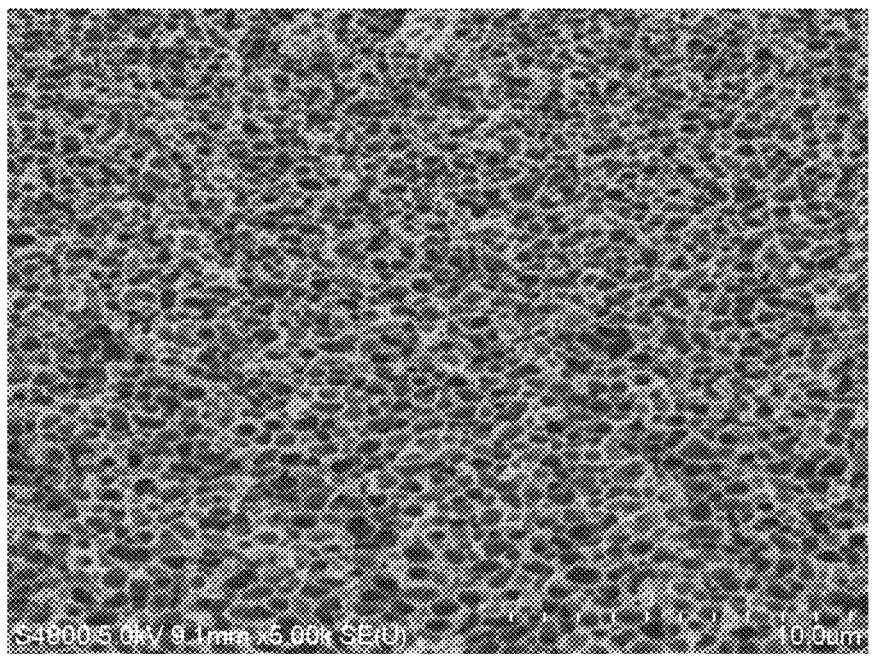
FIG. 5 is a sectional view of a resin composition in Example 7.

The mean porosity size of the independent porosity was 0.40 μm. The number distribution was examined. Then, 93% of the total porosity was included in a size of 0.28 to 0.52 μm. Moreover, the porosity ratio was 61%, and 95% of the total porosity was the independent porosity. The thickness of the obtained porous film was 150 μm. The cross section of the film was observed with the SEM. Then, the cross section had that illustrated in FIG. 5 (5,000-fold).

Example 8

Example 8 was conducted by the same method as that in Example 1 except that the amount of lithium chloride was adjusted so that the resin viscosity of polyamic acid was 59,000 cP.

The mean porosity size of the independent porosity was 0.60 µm. The number distribution was examined. Then, 82% of the total porosity was included in a size of 0.42 to 0.78 µm. Moreover, the porosity ratio was 63%, and 81% of the total porosity was the independent porosity. The thickness of the obtained porous film was 140 µm.

Example 9

Example 9 was conducted by the same method as that in Example 1 except that the amount of lithium chloride was adjusted so that the resin viscosity of polyamic acid was 39,000 cP.

The mean porosity size of the independent porosity was 0.80 µm. The number distribution was examined. Then, 82% of the total porosity was included in a size of 0.56 to 1.0 µm. Moreover, the porosity ratio was 62%, and 81% of the total porosity was the independent porosity. The thickness of the obtained porous film was 140 µm.

Example 10

A polyimide resin composition was produced by the same method as that in Example 7 except that the cast film was covered with a solvent substitution adjustment material (Poreflon Membrane, Gurley value: 330 sec/100 cc, Sumitomo Electric Fine Polymer, Inc.), and was subjected to phase transition.

The mean porosity size of the independent porosity was 0.40 µm. The number distribution was examined. Then, 91% of the total porosity was included in a size of 0.28 to 0.52 µm. Moreover, the porosity ratio was 60%, and 93% of the total porosity was the independent porosity. The thickness of the obtained porous film was 130 µm.

Example 11

A polyimide resin composition was produced by the same method as that in Example 9 except that the cast film casted on the substrate was immersed in a solution of water/methanol=1/1 (% by volume). The resin viscosity was 41,000 cP.

The mean porosity size of the independent porosity was 0.85 µm. The number distribution was examined. Then, 88% of the total porosity was included in a size of 0.60 to 1.1 µm. Moreover, the porosity ratio was 62%, and 86% of the total porosity was the independent porosity. The thickness of the obtained porous film was 140 µm.

Example 12

A polyimide resin composition was produced by the same method as that in Example 9 except that the cast film casted on the substrate was immersed in a solution of water/NMP=1/1 (% by volume). The resin viscosity was 40,000 cP.

The mean porosity size of the independent porosity was 0.88 µm. The number distribution was examined. Then, 86% of the total porosity was included in a size of 0.62 to 1.1 µm. Moreover, the porosity ratio was 63%, and 87% of the total porosity was the independent porosity. The thickness of the obtained porous film was 130 µm.

Example 13

A polyimide resin composition was produced by the same method as that in Example 9 except that the temperature of a solidifying solvent (water) was 70° C. The resin viscosity was 42,000 cP.

The mean porosity size of the independent porosity was 0.90 µm. The number distribution was examined. Then, 87% of the total porosity was included in a size of 0.63 to 1.17 µm. Moreover, the porosity ratio was 61%, and 87% of the total porosity was the independent porosity. The thickness of the obtained porous film was 135 µm.

Example 14

A polyimide resin composition was produced by the same method as that in Example 7 except that the resin concentration of polyamic acid was 30% by weight, and the amount of lithium chloride was adjusted so that the resin viscosity of the polyamic acid solution was 110,000 cP.

The mean porosity size of the independent porosity was 0.45 µm. The number distribution was examined. Then, 86% of the total porosity was included in a size of 0.32 to 0.59 µm. Moreover, the porosity ratio was 21%, and 87% of the total porosity was the independent porosity. The thickness of the obtained porous film was 130 µm.

Example 15

A polyimide resin composition was produced by the same method as that in Example 7 except that the resin concentration of polyamic acid was 25% by weight, and the amount of lithium chloride was adjusted so that the resin viscosity of the polyamic acid solution was 113,000 cP.

The mean porosity size of the independent porosity was 0.45 µm. The number distribution was examined. Then, 86% of the total porosity was included in a size of 0.32 to 0.59 µm. Moreover, the porosity ratio was 32%, and 87% of the total porosity was the independent porosity. The thickness of the obtained porous film was 130 µm.

Example 16

A polyimide resin composition was produced by the same method as that in Example 7 except that the resin concentration of polyamic acid was 15% by weight, and the amount of lithium chloride was adjusted so that the resin viscosity of the polyamic acid solution was 108,000 cP.

The mean porosity size of the independent porosity was 0.48 µm. The number distribution was examined. Then, 86% of the total porosity was included in a size of 0.34 to 0.62 µm. Moreover, the porosity ratio was 74%, and 87% of the total porosity was the independent porosity. The thickness of the obtained porous film was 130 µm.

Example 17

A polyimide resin composition was produced by the same method as that in Example 7 except that the resin concentration of polyamic acid was 10% by weight, and the amount of lithium chloride was adjusted so that the resin viscosity of the polyamic acid solution was 100,000 cP.

The mean porosity size of the independent porosity was 0.50 µm. The number distribution was examined. Then, 86% of the total porosity was included in a size of 0.35 to 0.65 µm. Moreover, the porosity ratio was 85%, and 87% of the total porosity was the independent porosity. The thickness of the obtained porous film was 130 µm.

Example 18

An N-methyl-pyrrolidone solution (HL-1210, Hitachi Chemical Co., Ltd.) of polyamidoimide was prepared.

Lithium chloride was added to the solution so that the concentration of lithium chloride might be 10% by weight, and dissolved. The resin viscosity at this time was 69,000 cP. A polyimide material (Kapton, Du Pont-Toray Co., Ltd.) was prepared as a substrate, and the above-mentioned solution was casted on the substrate using a coater. Subsequently, the cast film was immersed in distilled water for 5 minutes. The substrate was taken out from the water, and the obtained film was rinsed with distilled water.

Adhering water was wiped off, and the film was put into a drying furnace. After the film was dried at 80° C. for 1 hour, the temperature was raised to 150° C. at a heating rate of 10° C./min. After the film was heated at 150° C. for 30 minutes, the temperature was raised to 250° C. at a heating rate of 10° C./min. The film was heated at 250° C. for 10 minutes to produce a polyamide-imide resin composition.

The mean porosity size was 0.30 μm. The number distribution was examined. Then, 80% of the total porosity was included in a size of 0.21 to 0.39 μm. Moreover, the porosity ratio was 67%, and 81% of the total porosity was the independent porosity. The thickness of the obtained porous film was 120 μm.

Comparative Example 1

An N-methyl-pyrrolidone solution (HL-1210, Hitachi Chemical Co., Ltd.) of polyamidoimide was prepared. The resin concentration was 20% by weight, and the resin viscosity was 5,200 cP. A polyimide material (Kapton, Du Pont-Toray Co., Ltd.) having a thickness of 120 μm was prepared as a substrate, and the above-mentioned solution was casted on the substrate using a coater. After casting, the cast film was immediately kept for 4 minutes in a container having a humidity of approximately 100% and a temperature of 50° C. Subsequently, the cast film was immersed in water and subjected to phase transition. The film was taken out from the water, and the obtained film was rinsed with distilled water.

Adhering water was wiped off, and the film was dried under room temperature to obtain a polyamide-imide resin composition.

The mean porosity size was 1.0 μm. The number distribution was examined. Then, 68% of the total porosity was included in a size of 0.70 to 1.30 μm. Moreover, the porosity ratio was 62%, and 81% of the total porosity was the independent porosity. The thickness of the obtained porous film was 120 μm.

Comparative Example 2

An N-methyl-pyrrolidone (NMP) solution (U-varnish-A, Ube Industries, Ltd., the resin concentration of 20% by weight) of polyamic acid that is a polyimide precursor was prepared. The resin viscosity at this time was 7,200 cP. A polyimide material (Kapton, Du Pont-Toray Co., Ltd.) having a thickness of 120 μm was prepared as a substrate, and the above-mentioned solution was casted on the substrate using a coater. After casting, the cast film was immediately kept for 3 minutes in a container having a humidity of approximately 100% and a temperature of 50° C. Subsequently, the cast film was immersed in water and subjected to phase transition. The film was taken out from the water, and the obtained film was rinsed with distilled water.

Adhering water was wiped off, and the film was dried at 100° C. in a drying furnace. Subsequently, the film was dried for 60 minutes in a drying furnace of 260° C. to obtain a polyimide resin composition.

The mean porosity size was 2.5 μm. The number distribution was examined. Then, 69% of the total porosity was included in a size of 1.8 to 3.2 μm. Moreover, the porosity ratio was 62%, and 81% of the total porosity was the independent porosity. The thickness of the obtained porous film was 120 μm.

Comparative Example 3

An N-methyl-pyrrolidone (NMP) solution (U-varnish-A, Ube Industries, Ltd., the resin concentration of 20% by weight) of polyamic acid that is a polyimide precursor was prepared. A polyimide material (Kapton, Du Pont-Toray Co., Ltd.) having a thickness of 120 μm was prepared as a substrate, and the above-mentioned solution was casted on the substrate using a coater. The cast film was covered with a solvent substitution adjustment material (U-pore, Ube Industries, Ltd.) having a Gurley value: 800 sec/100 cc, immersed in water, and subjected to phase transition. Then, the cast film was subjected to thermal imidization by the same method as that in Example 1 to produce a polyimide resin composition. The resin viscosity was 7,800 cP.

The mean porosity size of the independent porosity was 13 μm. The number distribution was examined. Then, 82% of the total porosity was included in a size of 9.1 to 17 μm. Moreover, the porosity ratio was 64%, and 81% of the total porosity was the independent porosity. The thickness of the obtained porous film was 140 μm.

Comparative Example 4

A polyimide resin composition was produced by the same method as that in Comparative Example 3 except that the cast film was immersed in a solution of water/NMP=1/1 (% by volume) without using any solvent substitution adjustment material. The resin viscosity was 7,500 cP.

The mean porosity size of the independent porosity was 3.0 μm. The number distribution was examined. Then, 87% of the total porosity was included in a size of 2.1 to 3.9 μm. Moreover, the porosity ratio was 62%, and 87% of the total porosity was the independent porosity. The thickness of the obtained porous film was 140 μm.

Comparative Example 5

A polyimide resin composition was produced by the same method as that in Comparative Example 4 except that the cast film was immersed in a solution of water/methanol=1/1 (% by volume). The resin viscosity was 7,400 cP.

The mean porosity size of the independent porosity was 3.2 μm. The number distribution was examined. Then, 88% of the total porosity was included in a size of 2.2 to 4.1 μm. Moreover, the porosity ratio was 61%, and 86% of the total porosity was the independent porosity. The thickness of the obtained porous film was 140 μm.

Comparative Example 6

A polyimide resin composition was produced by the same method as that in Comparative Example 3 except that phase transition was performed without using any solvent substitution adjustment material. The resin viscosity was 7,200 cP.

Figure 6:
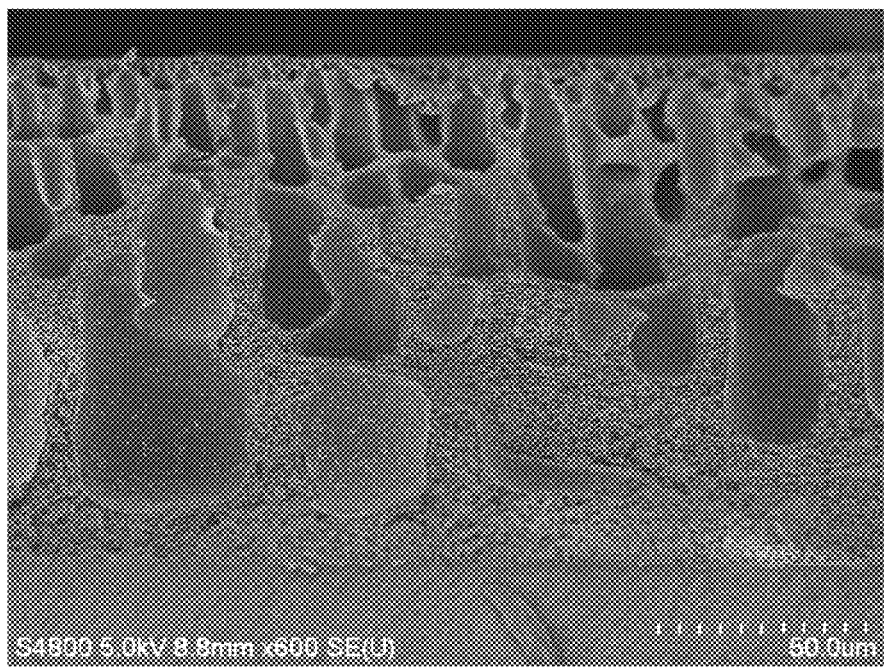
FIG. 6 is a sectional view of a resin composition in Comparative Example 6 outside of the range of the present invention.

The mean porosity size of the porosity was 5.2 μm. The number distribution was examined. Then, 64% of the total porosity was included in a size of 3.6 to 6.7 μm. Moreover, the porosity ratio was 65%, and 82% of the total porosity was the independent porosity. The thickness of the obtained porous film was 140 µm. The cross section of the film was observed with the SEM. Then, the cross section had that illustrated in FIG. 6 (600-fold).

Comparative Example 7

A polyimide resin composition was produced by the same method as that in Comparative Example 6 except that the temperature of a solidifying solvent (water) was 70° C. The resin viscosity was 7,100 cP.

The mean porosity size of the porosity was 6.0 µm. The number distribution was examined. Then, 81% of the total porosity was included in a size of 4.2 to 7.8 µm. Moreover, the porosity ratio was 64%, and 64% of the total porosity was the independent porosity.

Comparative Example 8

A polyimide resin composition was produced by the same method as that in Comparative Example 6 except that the resin concentration was 15% by weight. The resin viscosity was 6,200 cP.

Figure 7:
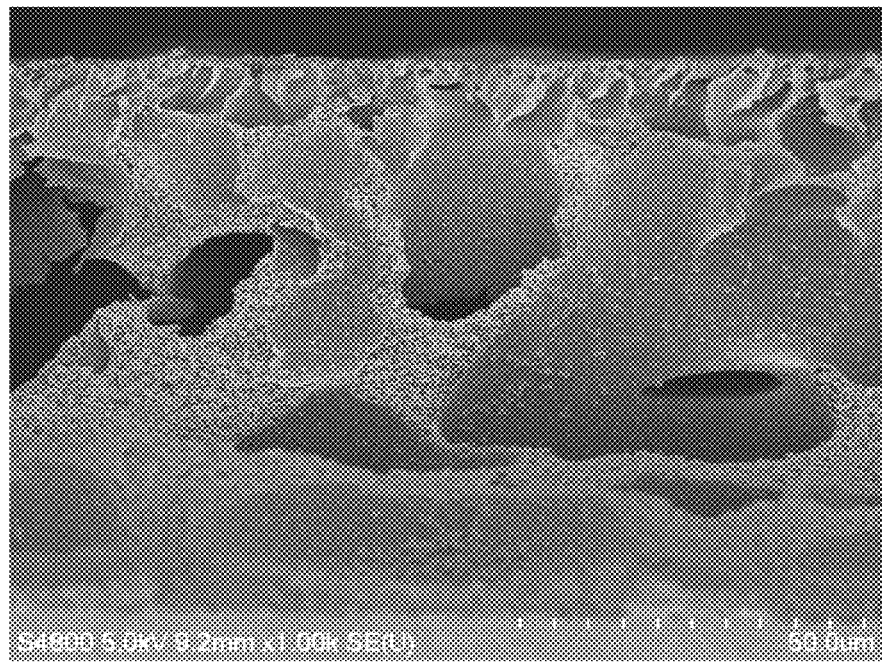
FIG. 7 is a sectional view of a resin composition in Comparative Example 8 outside of the range of the present invention.

The mean porosity size of the porosity was 5.5 µm. The number distribution was examined. Then, 64% of the total porosity was included in a size of 3.9 to 7.1 µm. Moreover, the porosity ratio was 69%, and 62% of the total porosity was the independent porosity. The cross section of the film was observed with the SEM. Then, the cross section had that illustrated in FIG. 7 (1,000-fold).

Comparative Example 9

Figure 8:
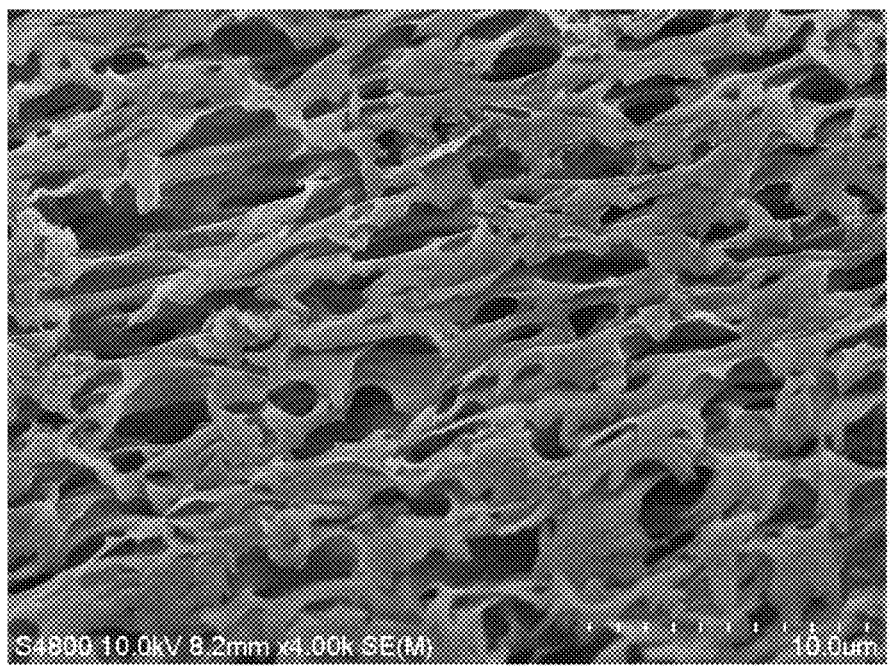
FIG. 8 is a sectional view of a resin composition in Comparative Example 9 outside of the range of the present invention.

A polyimide foamed sheet (UPILEX-FOAM BP021, Ube Industries, Ltd.) was prepared. The thickness was 500 µm. The porosity ratio was 60%. The cross section of the polyimide foamed sheet was observed with the SEM. Then, as illustrated in FIG. 8 (4,000-fold), the cross section had a structure having sponge-like continuous porosities.

Using the resin compositions (3 cm square) obtained from Examples 1 to 18 and Comparative Examples 1 to 9, the thermal conductivity, the compression resistance (ratio of thickness change before and after compression), and the thermal conductivity after compression were evaluated. The resin compositions were compressed using a press under conditions of a pressure 7 kgf/cm$^2$, a compression temperature of 170° C., and compression time of 4 hours. Subsequently, the compression resistance was evaluated. Table 1 shows the result.

TABLE 1

| | Porosity size [µm] | Independent porosity | Porosity size distribution | Porosity ratio [%] | Resin viscosity [cP] | Solvent substitution adjustment material | Thermal conductivity | Compression resistance | Thermal conductivity after compression |
|---|---|---|---|---|---|---|---|---|---|
| Example 1 | 0.015 | ++ | 81 | 65 | 120000 | — | + | +++ | + |
| Example 2 | 0.055 | ++ | 82 | 64 | 108000 | — | ++ | +++ | ++ |
| Example 3 | 0.10 | ++ | 82 | 61 | 96000 | — | ++ | +++ | ++ |
| Example 4 | 0.20 | ++ | 83 | 62 | 78000 | — | ++ | ++ | ++ |
| Example 5 | 0.20 | ++ | 94 | 63 | 118000 | 210 [sec/100 cc] | +++ | +++ | +++ |
| Example 6 | 0.40 | ++ | 82 | 64 | 69000 | — | +++ | ++ | ++ |
| Example 7 | 0.40 | ++ | 93 | 61 | 105000 | 300 [sec/100 cc] | +++ | +++ | +++ |
| Example 8 | 0.60 | ++ | 82 | 63 | 59000 | — | ++ | ++ | ++ |
| Example 9 | 0.80 | ++ | 82 | 62 | 39000 | — | ++ | ++ | ++ |
| Example 10 | 0.40 | ++ | 91 | 60 | 11000 | 330 [sec/100 cc] | +++ | +++ | +++ |
| Example 11 | 0.85 | ++ | 88 | 62 | 41000 | — | ++ | + | ++ |
| Example 12 | 0.88 | ++ | 86 | 63 | 40000 | — | ++ | + | ++ |
| Example 13 | 0.90 | ++ | 87 | 62 | 42000 | — | ++ | + | ++ |
| Example 14 | 0.45 | ++ | 86 | 21 | 110000 | 300 [sec/100 cc] | + | +++ | ++ |
| Example 15 | 0.45 | ++ | 86 | 32 | 113000 | 300 [sec/100 cc] | + | +++ | ++ |
| Example 16 | 0.48 | ++ | 86 | 74 | 108000 | 300 [sec/100 cc] | +++ | + | ++ |
| Example 17 | 0.50 | ++ | 86 | 85 | 100000 | 300 [sec/100 cc] | +++ | + | + |
| Example 18 | 0.30 | ++ | 80 | 67 | 69000 | — | +++ | ++ | +++ |
| Comparative Example 1 | 1.0 | ++ | 68 | 62 | 5200 | — | ++ | + | − |
| Comparative Example 2 | 2.5 | ++ | 69 | 62 | 7200 | — | + | + | − |
| Comparative Example 3 | 13 | ++ | 82 | 62 | 7800 | 800 [sec/100 cc] | − | + | − |
| Comparative Example 4 | 3.0 | ++ | 87 | 62 | 7500 | — | + | + | + |
| Comparative Example 5 | 3.2 | ++ | 88 | 61 | 7400 | — | + | − | + |
| Comparative Example 6 | 5.2 | ++ | 64 | 65 | 7100 | — | + | + | − |
| Comparative Example 7 | 6.0 | + | 81 | 64 | 7200 | — | + | + | − |
| Comparative Example 8 | 5.5 | + | 64 | 69 | 6200 | — | + | − | − |
| Comparative Example 9 | continuous porosities | − | — | 60 | — | — | +++ | − | + |

In Examples 1 to 18 and Comparative Examples 1 to 9, the thermal conductivity, the compression resistance, and the thermal conductivity after compression were evaluated according to the criteria as follows:

(The independent porosity: the ratio of the independent porosities based on the total porosity, ++: not less than 80%, +: not less than 60% and not more than 80%, and −: less than 60%.)

(The porosity size distribution: the proportion of the porosity having a porosity size within ±30% of the mean porosity size based on the total porosity.)

(The thermal conductivity $\lambda$ [W/mK]: +++: $\lambda<0.05$, ++: $0.05 \leq \lambda<0.075$, +: $0.075 \leq \lambda<0.1$, and −: $\lambda \geq$ not less than 0.1 [W/mK].)

(The compression resistance: +++=less than 1%, ++=not less than 1% and less than 5%, +=not less than 5% and less than 10%, and −=not less than 10%.)

From Table 1, it turned out that a film having a smaller porosity size has a more preferable compression resistance. It also turned out that a film having a smaller porosity size has higher mechanical strength, and therefore reduction in thermal conductivity by compression can be suppressed in spite of the high porosity ratio of the film. It also turned out that a low porosity ratio leads to a high thermal conductivity, and conversely, a high porosity ratio lead to poor mechanical strength.

On the other hand, the film having macro voids and continuous porosities had poor compression resistance, and therefore showed remarkable increase in the thermal conductivity by compression.

Example 19

Carbon black (Denka Black, Denki Kagaku Kogyo K. K.) was added to N-methyl-pyrrolidone (NMP) solution (U-varnish-A, Ube Industries, Ltd., the resin concentration of 20% by weight) of polyamic acid so that the concentration of carbon black might be 5, 10, 15, 20, 25, and 30% by weight. Then, carbon black was dispersed in the resin solution using a roll mill dispersion machine (BR-100V, IMEX Co., Ltd.). Lithium chloride was added to each solution so that the concentration of lithium chloride might be 15% by weight. The dispersing solution was casted on a polyimide material (Kapton, Du Pont-Toray Co., Ltd.) having a thickness of 120 μm, and the cast film was immersed in water (the viscosity of the resin solution containing 15% by weight of carbon black was 120,000 cP). The cast film was subjected to thermal imidization by the same method as that in Example 1 to obtain a polyimide resin composition containing carbon black.

Figure 9:
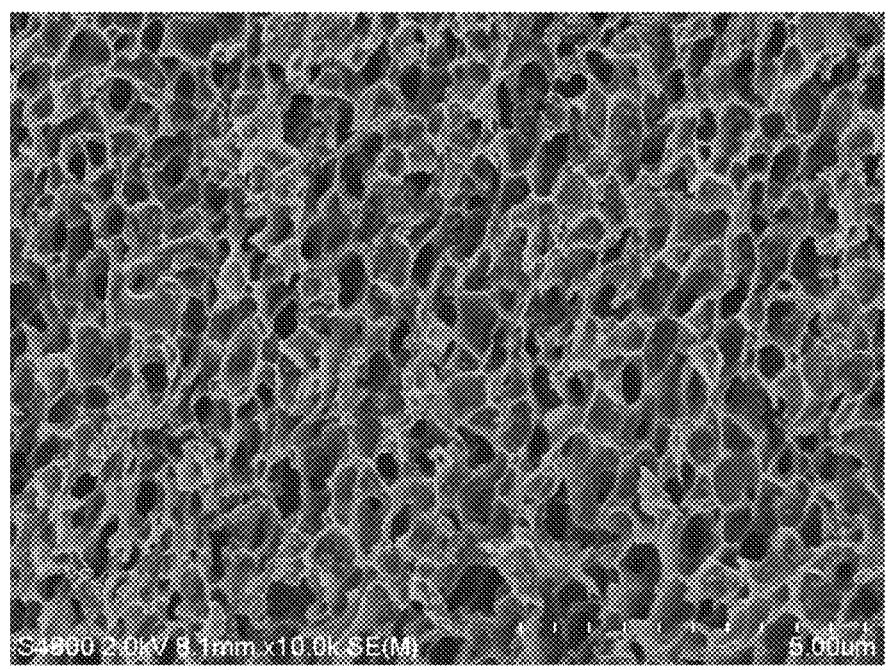
FIG. 9 is a sectional view of a resin composition having carbon black in Example 21.

The mean porosity size of the resin composition containing 15% by weight of carbon black was 0.060 μm. The number distribution was examined. Then, 82% of the total porosity was included in a size of 0.042 to 0.078 μm. The porosity ratio was measured. Then, the porosity ratio was 66%, and 81% of the total porosity was the independent porosity. The thickness of the obtained film was 180 μm. FIG. 9 (10,000-fold) illustrates the cross section of the film made of the resin composition containing 15% by weight of carbon black.

Example 20

A resin composition containing carbon black was obtained by the same method as that in Example 19 except that the amount of lithium chloride was adjusted so that the resin viscosity was adjusted (the viscosity of the resin solution containing 15% by weight of carbon black was 94,000 cP).

The mean porosity size of the resin composition containing 15% by weight of carbon black was 0.25 μm. The number distribution was examined. Then, 82% of the total porosity was included in a size of 0.18 to 0.32 μm. The porosity ratio was measured. Then, the porosity ratio was 65%, and 82% of the total porosity was the independent porosity. The thickness of the obtained film was 150 μm.

Example 21

A resin composition was produced by the same method as that in Example 19 except that the cast film was covered with a solvent substitution adjustment material (U-pore, a Gurley value: 210 sec/100 cc, Ube Industries, Ltd.), and subjected to phase transition. The viscosity of the polyamic acid resin solution containing 15% by weight of carbon black was 123,000 cP.

The mean porosity size of the resin composition containing 15% by weight of carbon black was 0.28 μm. The number distribution was examined. Then, 92% of the total porosity was included in a size of 0.20 to 0.36 μm. The porosity ratio was measured. Then, the porosity ratio was from 65 to 69%, and 93% of the total porosity was the independent porosity. Each thickness of the obtained films was 180 μm.

Example 22

A resin composition containing carbon black was obtained by the same method as that in Example 19 except that the amount of lithium chloride was adjusted so that the resin viscosity was adjusted (the viscosity of the resin solution containing 15% by weight of carbon black was 60,000 cP).

The mean porosity size of the resin composition containing 15% by weight of carbon black was 0.53 μm. The number distribution was examined. Then, 82% of the total porosity was included in a size of 0.37 to 0.69 μm. The porosity ratio was measured. Then, the porosity ratio was 65%, and 81% of the total porosity was the independent porosity. The thickness of the obtained film was 150 μm.

Example 23

A resin composition was produced by the same method as that in Example 22 except that the cast film was covered with a solvent substitution adjustment material (U-pore, a Gurley value: 410 sec/100 cc, Ube Industries, Ltd.), and subjected to phase transition. The viscosity of the polyamic acid resin solution containing 15% by weight of carbon black was 108,000 cP.

The mean porosity size of the resin composition containing 15% by weight of carbon black was 0.72 μm. The number distribution was examined. Then, 92% of the total porosity was included in a size of 0.50 to 0.93 μm. The porosity ratio was measured. Then, the porosity ratio was 64%, and 90% of the total porosity was the independent porosity. The thickness of the obtained film was 170 μm.

Example 24

A resin composition containing carbon black was obtained by the same method as that in Example 19 except that the amount of lithium chloride was adjusted so that the resin viscosity was adjusted (the viscosity of the resin solution containing 15% by weight of carbon black was 39,000 cP).

The mean porosity size of the resin composition containing 15% by weight of carbon black was 0.90 μm. The number distribution was examined. Then, 84% of the total porosity was included in a size of 0.63 to 1.17 μm. The porosity ratio was measured. Then, the porosity ratio was 65%, and 81% of the total porosity was the independent porosity. The thickness of the obtained film was 150 μm.

Comparative Example 10

Carbon black (Denka Black, Denki Kagaku Kogyo K. K.) was added to N-methyl-pyrrolidone solution (HL-1210, Hitachi Chemical Co., Ltd., 20% by weight, 4,800 cP) of polyamidoimide so that the concentration of carbon black might be 5, 10, 15, 20, 25, and 30% by weight. Then, carbon black was dispersed in the resin solution using a roll mill dispersion machine (BR-100V, IMEX Co., Ltd.).

The dispersing solution was casted on a polyimide material (Kapton, Du Pont-Toray Co., Ltd.) having a thickness of 120 μm. The cast film was kept for 4 minutes in a container having a humidity of approximately 100% and a temperature of 50° C. Subsequently, the cast film was immersed in water and subjected to phase transition. The film was taken out from the water, and subjected to air drying at room temperature to obtain a resin composition of polyamidoimide. The viscosity of the resin solution containing 15% by weight of carbon black was 6,900 cP.

The mean porosity size of the resin composition containing 15% by weight of carbon black was 1.0 μm. The number distribution was examined. Then, 82% of the total porosity was included in a size of 0.70 to 1.3 μm. The porosity ratio was measured. Then, the porosity ratio was 63%, and 67% of the total porosity was the independent porosity. The thickness of the obtained film was 150 μm.

Comparative Example 11

Carbon black (Denka Black, Denki Kagaku Kogyo K. K.) was added to N-methyl-pyrrolidone (NMP) solution (U-varnish-A, Ube Industries, Ltd., the resin concentration of 20% by weight) of polyamic acid that is a polyimide precursor so that the concentration of carbon black might be 5, 10, 15, 20, 25, and 30% by weight. Then, carbon black was dispersed in the resin solution using a roll mill dispersion machine (BR-100V, IMEX Co., Ltd.).

The dispersing solution was casted on a polyimide material (Kapton, Du Pont-Toray Co., Ltd.) having a thickness of 120 μm. The cast film was kept for 3 minutes in a container having a humidity of approximately 100% and a temperature of 50° C., and subsequently was immersed in water. The cast film was taken out from the water, and dried at 100° C. Subsequently, the film was dried for 60 minutes in a 260° C. drying furnace to obtain a resin composition containing carbon black. The viscosity of the resin solution containing 15% by weight of carbon black was 8,200 cP.

The mean porosity size of the resin composition containing 15% by weight of carbon black was 3.2 μm. The number distribution was examined. Then, 69% of the total porosity was included in a size of 2.2 to 4.2 μm. The porosity ratio was measured. Then, the porosity ratio was 63%, and 83% of the total porosity was the independent porosity. The thickness of the obtained film was 150 μm.

Comparative Example 12

A resin composition containing carbon black was obtained by the same method as that in Example 19 except that the cast film made of the dispersion liquid of carbon black in Comparative Example 11 (the viscosity of the resin solution when 15% by weight of carbon black was contained was 8,200 cP) was covered with a solvent substitution adjustment material (U-pore, a Gurley value: 800 sec/100 cc, Ube Industries, Ltd.), and was subjected to phase transition.

The mean porosity size of the resin composition containing 15% by weight of carbon black was 15 μm. The number distribution was examined. Then, 82% of the total porosity was included in a size of 11 to 19 μm. The porosity ratio was measured. Then, the porosity ratio was 61%, and 82% of the total porosity was the independent porosity. The thickness of the obtained film was 150 μm.

Comparative Example 13

A resin composition containing carbon black was obtained by the same method as that in Comparative Example 12 except that the cast film was subjected to phase transition without covering the cast film with any solvent substitution adjustment material. The viscosity of the resin solution when 15% by weight of carbon black was contained was 9,000 cP.

The mean porosity size of the obtained film was 6.8 μm. The number distribution was examined. Then, 64% of the total porosity was included in a size of 0.65 to 1.2 μm. The porosity ratio was measured. Then, the porosity ratio was 62%, and 63% of the total porosity was the independent porosity. The thickness of the obtained film was 150 μm.

Comparative Example 14

A resin composition containing carbon black was obtained by the same method as that in Comparative Example 13 except that the temperature of the solidifying solvent (water) was 70° C. The viscosity of the resin solution when 15% by weight of carbon black was contained was 8,500 cP.

The mean porosity size of the obtained film was 7.4 μm. The number distribution was examined. Then, 81% of the total porosity was included in a size of 5.2 to 9.6 μm. The porosity ratio was measured. Then, the porosity ratio was 64%, and 63% of the total porosity was the independent porosity. The thickness of the obtained film was 150 μm.

Comparative Example 15

A resin composition containing carbon black was obtained by the same method as that in Comparative Example 13 except that the resin concentration was 16% by weight. The viscosity of the resin solution containing 15% by weight of carbon black was 5,700 cP.

The mean porosity size of the obtained film was 7.9 μm. The number distribution was examined. Then, 61% of the total porosity was included in a size of 5.5 to 10 μm. The porosity ratio was measured. Then, the porosity ratio was 69%, and 83% of the total porosity was the independent porosity. The thickness of the obtained film was 150 μm.

Comparative Example 16

Production of a resin composition containing carbon black by the same method as that in Comparative Example 13 except that the carbon black concentration was 35% by weight was tried. However, carbon black could not be dispersed so that the film could not be formed.

Comparative Example 17

A resin composition containing carbon black was obtained by the same method as that in Comparative Example 13 except that the carbon black concentration was 0.5% by weight. However, the resistance of the obtained film was not reduced.

The electrical properties of the porous films were examined using Examples 19 to 24 and Comparative Examples 10 to 17. Table 2 shows the result.

The thermal conductivity, the compression resistance, and dielectric breakdown were evaluated using the films containing 15% by weight of carbon black in the resin composition according to Examples 19 to 24 and Comparative Examples 10 to 17.

(The compression resistance: +++=less than 1%, ++=not less than 1% and less than 5%, +=not less than 5% and less than 10%, and −=not less than 10%.)

(The control of resistance: ++: less than 1.5, +: not less than 1.5 and less than 2.0, and −: not less than 2.0.)

(The dielectric breakdown: ++=no breakdown, −=breakdown.)

From Table 2, in the case where the porosity size was large or the porosity size distribution was wide, namely, in the case of poor uniformity of the porosities, carbon black was nonuniformly dispersed. This caused rapid resistance change, resulting in difficulties to control the resistance according to the amount of carbon black. Further, the dielectric breakdown has occurred because of portions where carbon black nonuniformly existed. On the other hand, the films having the independent porosities of Examples 19 to 24 showed improvement in the compression

TABLE 2

| | Porosity size [µm] | Independent porosity | Porosity size distribution | Porosity ratio [%] | Resin viscosity [cP] | Solvent substitution adjustment material | Thermal conductivity | Compression resistance | Control of resistance | Dielectric breakdown |
|---|---|---|---|---|---|---|---|---|---|---|
| Example 19 | 0.060 | ++ | 82 | 66 | 120000 | — | + | +++ | + | ++ |
| Example 20 | 0.25 | ++ | 82 | 65 | 94000 | — | ++ | +++ | + | ++ |
| Example 21 | 0.28 | ++ | 92 | 65 | 123000 | 210 [sec/100 cc] | ++ | +++ | ++ | ++ |
| Example 22 | 0.53 | ++ | 82 | 65 | 60000 | — | ++ | +++ | + | ++ |
| Example 23 | 0.72 | ++ | 92 | 64 | 108000 | 410 [sec/100 cc] | ++ | +++ | ++ | ++ |
| Example 24 | 0.90 | ++ | 84 | 65 | 39000 | — | + | ++ | ++ | ++ |
| Comparative Example 10 | 1.0 | ++ | 67 | 63 | 6900 | — | + | ++ | − | − |
| Comparative Example 11 | 3.2 | ++ | 69 | 63 | 8200 | — | − | ++ | − | − |
| Comparative Example 12 | 15 | ++ | 82 | 64 | 8200 | 800 [sec/100 cc] | − | + | − | − |
| Comparative Example 13 | 6.8 | + | 64 | 62 | 9000 | — | − | + | − | − |
| Comparative Example 14 | 7.4 | + | 81 | 64 | 8500 | — | + | + | − | − |
| Comparative Example 15 | 7.9 | ++ | 61 | 69 | 5700 | — | + | + | − | − |
| Comparative Example 16 | — | − | — | — | — | — | − | − | − | − |
| Comparative Example 17 | — | − | — | — | — | — | − | − | − | − |

In Examples 19 to 24 and Comparative Examples 10 to 17, according to the criteria as follows, the thermal conductivity, the compression resistance (the ratio of thickness change before and after compression), the control of resistance (in a plot (percolation curve) of the resistance and the amount of carbon black (CB), an inclination when the amounts of CB corresponding to $10^6$ Ωcm and $10^{14}$ Ωcm were a denominator and common logarithms of the resistance ($10^6$ Ωcm and $10^{14}$ Ωcm) were a numerator), and the dielectric breakdown (a voltage of 300 V was applied to the film for 1 minute) were evaluated.

(The independent porosity: the ratio of the independent porosities based on the total porosity, ++: not less than 80%, +: not less than 60% and not more than 80%, and −: less than 60%.)

(The porosity size distribution: the proportion of the porosity having a porosity size within ±30% of the mean porosity size based on the total porosity.)

(The thermal conductivity λ [W/mK]: +++: λ<0.05, ++: 0.05≤λ<0.075, +: 0.075≤λ<0.1, and −: λ≥not less than 0.1 [W/mK].)

resistance because the films contain carbon black, in addition to good thermal conductivity and good control of the resistance.

Example 25

Figure 10:
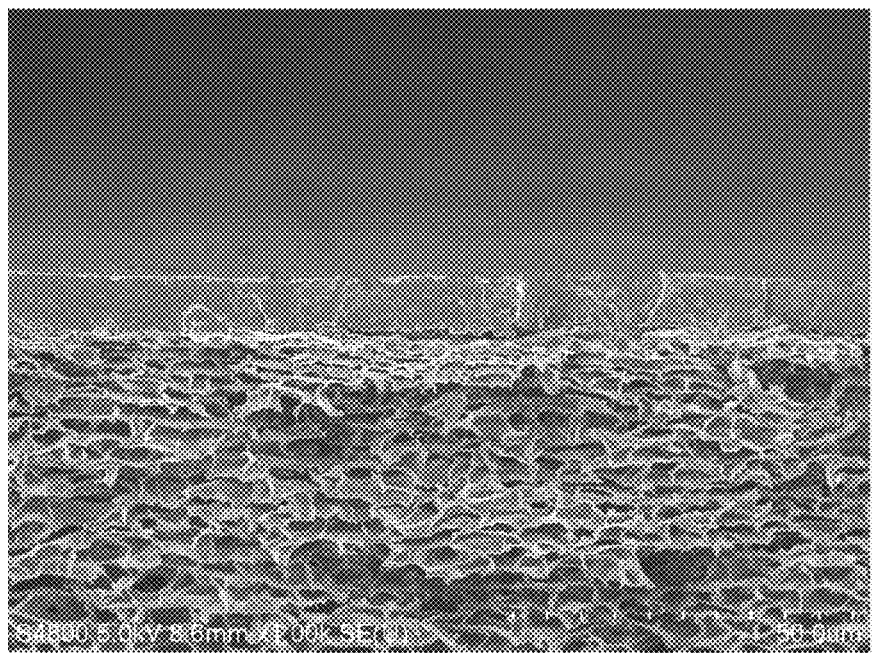
FIG. 10 is a sectional view of a lamination film in Example 25.

PFA was laminated on the resin composition obtained in Example 5. Lamination was conducted by applying PFA dispersion (510CL, Du Pont-Mitsui Fluorochemicals Company, Ltd.) on the resin composition with a spray injection apparatus, and heating the product for 10 minutes at 350° C. The thickness of the PFA was measured. Then, the thickness thereof was 5 µm. The surface roughness Rz was 0.5 µm. The cross section thereof was observed with the SEM. Then, the cross section had that as illustrated in FIG. 10 (1,000-fold).

Example 26

The PFA was laminated on the resin composition obtained in Example 8 by the same method as that in Example 25.

Lamination was conducted by applying the PFA dispersion on the resin composition with the spray injection apparatus, and heating the product for 10 minutes at 350° C. The thickness of the PFA was measured. Then, the thickness thereof was 6 μm. The surface roughness Rz was 0.6 μm.

Comparative Example 18

The PFA was laminated on the resin composition obtained in Comparative Example 2 by the same method as that in Example 25. The thickness of the PFA was measured. Then, the thickness thereof was 6 μm. The surface roughness Rz was measured. Then, the surface roughness Rz was 0.9 μm.

A fixing test was conducted using the resin compositions according to Examples 25 and 26 and Comparative Example 18. First, a toner was transferred onto the resin composition using image press C1 (Canon, Inc.). In the fixing test, the film having the transferred toner was fixed on an aluminum stage, and heated with a halogen lamp of 800 W for 100 msec. Subsequently, the stage was moved at a rate of 360 mm/sec, and fixing to a medium after 100 msec was considered. It is configured such that the medium is fixed to an aluminum roller around which an elastic rubber is wrapped, to form a nip portion with the aluminum stage. Fixing was performed at a pressure at the nip portion of 10 kgf/cm² and pressurization time of 10 msec. Table 3 shows the result.

TABLE 3

|  | Thermal conductivity | Coverage |
|---|---|---|
| Example 25 | +++ | ++ |
| Example 26 | ++ | + |
| Comparative Example 18 | + | − |

In Examples 25 to 26 and Comparative Example 18, the thermal conductivity and the coverage were evaluated according to the criteria as follows.

(The thermal conductivity λ [W/mK]: +++: λ<0.05, ++: 0.05≤λ<0.075, +: 0.075≤λ<0.1, and −: λ≥not less than 0.1 [W/mK].)

(The coverage: evaluated as a toner residual ratio on a medium when a fixed object was bent crosswise and the printed matter was scrubbed with a brass around which a silbond sheet was wrapped; ++=the toner residual ratio after the test is not less than 75%, +=the toner residual ratio is not less than 50% and less than 75%, and −=the toner residual ratio is less than 50%.)

In Example 25, the thermal conductivity of the lamination film is low, and reduction in the toner temperature during conveyance is suppressed. It turned out that, for that reason, the toner is kept molten until the toner is fixed onto the medium so that the toner is firmly fixed onto the medium. On the other hand, in Comparative Example 18, the toner temperature was reduced during conveyance due to the high thermal conductivity of the lamination film. For that reason, the toner solidified at the time of nip, and poor fixing occurred.

Example 27

As a substrate for a fixing belt, a conductive polyimide sheet formed into an endless belt shape having a perimeter length of 500 mm and having a thickness of 125 μm was fixed to a tubular cylinder having an inner diameter of 30 mm and a length of 500 mm. An NMP (the resin concentration of 20% by weight) solution of polyamic acid was uniformly applied onto an outer circumferential surface of the polyimide sheet with dip coating, the NMP solution containing 15% by weight of lithium chloride and 15% by weight of carbon black (Denka Black, Denki Kagaku Kogyo K. K.) and having the viscosity (120,000 cP) adjusted according to the amount of lithium chloride. Next, the coating film was covered with a solvent substitution adjustment material (U-pore, a Gurley value: 210 sec/100 cc, Ube Industries, Ltd.), and the tubular cylinder was immersed in water for 20 minutes.

Next, the applied solvent substitution adjustment material was peeled off. Adhering water was wiped off, and the film was put into a drying furnace. After the film was dried at 80° C. for 1 hour, the temperature was raised to 150° C. at a temperature raising rate of 10° C./min. After the film was heated at 150° C. for 30 minutes, the temperature was raised to 250° C. at a temperature raising rate of 10° C./min. After the film was heated at 250° C. for 10 minutes, the temperature was raised to 350° C. at a temperature raising rate of 10° C./min. The, the film was heated for 10 minutes at 350° C. to produce a polyimide resin composition.

The mean porosity size was 0.20 μm. The number distribution was examined. Then, 90% of the total porosity was included in a size of 0.14 to 0.26 μm. The porosity ratio was 65%, and 90% of the total porosity was the independent porosity. Moreover, the thickness was 150 μm.

The PFA dispersion was applied onto the thus-obtained endless sheet of porosity polyimide using a spray gun. The PFA dispersion was applied onto the resin composition surface thereof. A lamination film made of the PFA was obtained by heating at 350° C. for 10 minutes. The thickness of the PFA was 5 μm. The surface roughness (Rz) was 0.9 μm.

Example 28

An endless fixing belt was produced by the same method as that in Example 27 except that the amount of lithium chloride was adjusted so that the resin viscosity was 65,000 cP, and the film was subjected to phase transition without covering the film with any solvent substitution adjustment material. The mean porosity size of the porous layer was 0.80 μm. The number distribution was examined. Then, 82% of the total porosity was included in a size of 0.56 to 1.0 μm. The porosity ratio was 65%, and 87% of the total porosity was the independent porosity. Moreover, the thickness was 140 μm. Application of the PFA onto the resin composition was conducted in the same manner as in Example 27. The thickness of the PFA was 7 μm. The surface roughness (Rz) was 0.8 μm.

Comparative Example 19

An endless fixing belt was produced by the same method as that in Example 27 except that lithium chloride was not added, and the film was immersed in water without covering the film with any solvent substitution adjustment material. The mean porosity size of the porous layer was 4.8 μm. The number distribution was examined. Then, 62% of the total porosity was included in a size of 3.4 to 6.2 μm. The porosity ratio was 65%, and 65% of the total porosity was the independent porosity. Application of the PFA onto the resin composition was conducted in the same manner as in Example 27. The thickness of the PFA was 7 μm. The surface roughness (Rz) was 0.8 μm.

Comparative Example 20

The polyimide foamed sheet shown in Comparative Example 9 and containing carbon black in a concentration of 15% by weight was attached onto the conductive polyimide sheet described in Example 27. The PFA was laminated thereon according to the method described in Example 27. The thickness of the PFA was 7 μm. The surface roughness (Rz) was 0.7 μm.

Subsequently, the fixing belts obtained in Examples 27 and 28 and Comparative Examples 19 and 20 each were assembled into the fixing apparatus illustrated in FIG. 2. Next, a toner image was transferred from the photosensitive drum onto the fixing belt at a process speed 500 mm/s using an image forming apparatus on which this fixing apparatus was mounted, and subsequently the toner was molten at 180° C. using a heating radiation source. When 100 K sheets (K means 1,000) are passed through at an arrival time of the molten toner to the fixing nip of 40 ms (fixing nip width of 15 mm), the following items were evaluated. Table 4 shows the evaluation result.

1) Fixed image
2) Fixing of the toner onto the fixing belt

The "fixed image" and "fixing of the toner onto the fixing belt" were evaluated by ranking. The rank is from 1 to 5, and it is shown that a larger rank is better. Moreover, an OK level is rank 3 or more.

TABLE 4

| | Number of sheets passed through | Fixed image | Fixing of toner |
|---|---|---|---|
| Example 27 | 100K-OK | 4 | 5 |
| Example 28 | 100K-OK | 3 | 4 |
| Comparative Example 19 | 30K-NG | 2 | 4 |
| Comparative Example 20 | 100K-NG | Not fixed from beginning | 1 |

From Table 4, it turns out that in the belt member containing the porous film having a small thermal conductivity and a high compression resistance, good fixing is also performed in continuous printing, and the toner is not fixed to the belt.

Example 29

As a substrate for a fixing roller, a 400-μm silicone rubber (TSE3033, Momentive Performance Materials, Inc.) was formed on an aluminum roller of ϕ50 cm. Next, using a primer, porosity polyimide on which the thin film PFA was laminated described in Example 27 was attached on the silicone rubber to produce a fixing roller containing a porous layer.

Example 30

A fixing roller containing a porous layer was produced by the same method as that in Example 29 except that porosity polyimide on which the thin film PFA was laminated described in Example 28 was used.

Comparative Example 21

A fixing roller containing a porous layer was produced by the same method as that in Example 29 except that porosity polyimide on which the thin film PFA was laminated described in Comparative Example 19 was used.

The fixing rollers obtained by Examples 29 and 30 and Comparative Example 21 each were assembled into the fixing apparatus illustrated in FIG. 3. Next, using the image forming apparatus on which this fixing apparatus was mounted, the toner was molten at 180° C. and at a process speed of 400 mm/sec using an external heating source using a heater. When 120 K sheets are passed through at an arrival time of the molten toner to the fixing nip of 60 ms (fixing nip width of 12 mm), the following items were evaluated. Table 5 shows the evaluation result.

1) Fixed image
2) Fixing of the toner onto the fixing belt

The "fixed image" and "fixing of the toner onto the fixing belt" were evaluated by ranking. The rank is from 1 to 5, and it is shown that a larger rank is better. Moreover, an OK level is rank 3 or more.

TABLE 5

| | Number of sheets passed through | Fixed image | Fixing of toner |
|---|---|---|---|
| Example 29 | 120K-OK | 4 | 5 |
| Example 30 | 120K-OK | 3 | 4 |
| Comparative Example 21 | 30K-NG | 2 | 2 |

From Table 5, it turns out that in the roller member containing the porous film having a small thermal conductivity and a high compression resistance, good fixing is also performed in continuous printing, and the toner is not fixed to the roller.

Example 31

Polycarbonate (Z400, Mitsubishi Gas Chemical Company, Inc.) was dissolved in N-methyl pyrrolidone (NMP) of polyamic acid to prepare a solution of 20% by weight. Lithium chloride was added to this solution so that the concentration of lithium chloride might be 15% by weight, and dissolved. The viscosity of this solution was 105,000 cP. A polyester material (Teijin, Ltd.) was prepared as a substrate, and the polycarbonate solution was casted thereon using a coater. Subsequently, the cast film was immersed in distilled water for 5 minutes. The substrate was taken out from the water, and the obtained film was rinsed with distilled water.

Figure 11:
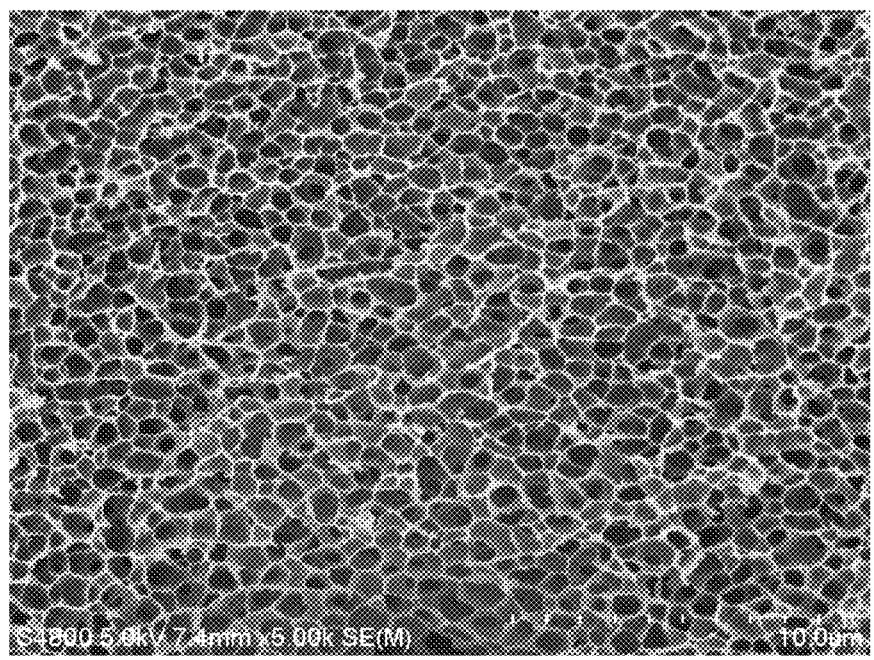
FIG. 11 is a sectional view of a resin composition in Example 32.

Adhering water was wiped off, and the film was put into a drying furnace to be dried at 80° C. for 1 hour. The porosity form of the obtained film was examined. As a result, the mean porosity size of the independent porosity was 0.015 μm. With respect to the number distribution, 82% of the total porosity was included in a size of 0.011 to 0.020 μm. Moreover, the porosity ratio was 65%, and the thickness of the obtained film was 70 μm. The cross section of the film was observed with the SEM. As a result, the cross section had that as illustrated in FIG. 11 (5,000-fold), and 82% of the total porosity was the independent porosity.

Example 32

A polycarbonate resin composition was obtained by the same method as that in Example 31 except that when the cast film was immersed in water, the cast film was covered with a solvent substitution adjustment material (U-pore, a Gurley value: 210 sec/100 cc, Ube Industries, Ltd.) and was subjected to phase transition. The viscosity of the resin solution was 108,000 cP.

The mean porosity size of the independent porosity was 0.20 µm. With respect to the number distribution, 92% of the total porosity was included in a size of 0.14 to 0.26 µm. Moreover, the porosity ratio was 64%, and 91% of the total porosity was the independent porosity. The cross section of the film was observed with the SEM. Then, the cross section had that illustrated in FIG. 11 (5,000-fold).

Example 33

A polycarbonate resin composition was obtained by the same method as that in Example 31 except that the amount of lithium chloride was adjusted so that the resin viscosity of solution was 72,000 cP.

The mean porosity size of the independent porosity was 0.50 µm. With respect to the number distribution, 82% of the total porosity was included in a size of 0.35 to 0.65 µm. Moreover, the porosity ratio was 61%, and 80% of the total porosity was the independent porosity.

Example 34

A polycarbonate resin composition was obtained by the same method as that in Example 31 except that the amount of lithium chloride was adjusted so that the resin viscosity of solution was 39,000 cP.

The mean porosity size of the independent porosity was 0.84 µm. With respect to the number distribution, 82% of the total porosity was included in a size of 0.59 to 1.1 µm. Moreover, the porosity ratio was 61%, and 80% of the total porosity was the independent porosity.

Comparative Example 22

A polycarbonate resin composition was obtained by the same method as that in Example 31 except that the resin was casted without adding lithium chloride, and the cast film was kept for 2.5 minutes in a container having a humidity of approximately 100% and a temperature of 50° C. The viscosity of the resin solution was 7,600 cP.

The mean porosity size of the independent porosity was 2.8 µm. The number distribution was examined. Then, 65% of the total porosity was included in a size of 2.0 to 3.6 µm. Moreover, the porosity ratio was 64%, and 81% of the total porosity was the independent porosity. The thickness of the obtained porous film was 140 µm.

Comparative Example 23

A polycarbonate resin composition was produced by the same method as that in Example 31 except that lithium chloride was not added, and the cast film was covered with a solvent substitution adjustment material (a Gurley value: 800 sec/100 c, Ube Industries, Ltd.), and was subjected to phase transition. The viscosity of the solution was 7,600 cP.

The mean porosity size of the independent porosity was 13 µm. The number distribution was examined. Then, 82% of the total porosity was included in a size of 9.1 to 17 µm. Moreover, the porosity ratio was 64%, and 81% of the total porosity was the independent porosity. The thickness of the obtained porous film was 140 µm.

Comparative Example 24

A polycarbonate resin composition was produced by the same method as that in Comparative Example 23 except that the cast film was subjected to phase transition without covering the cast film with any solvent substitution adjustment material. The resin viscosity was 9,000 cP.

Figure 12:
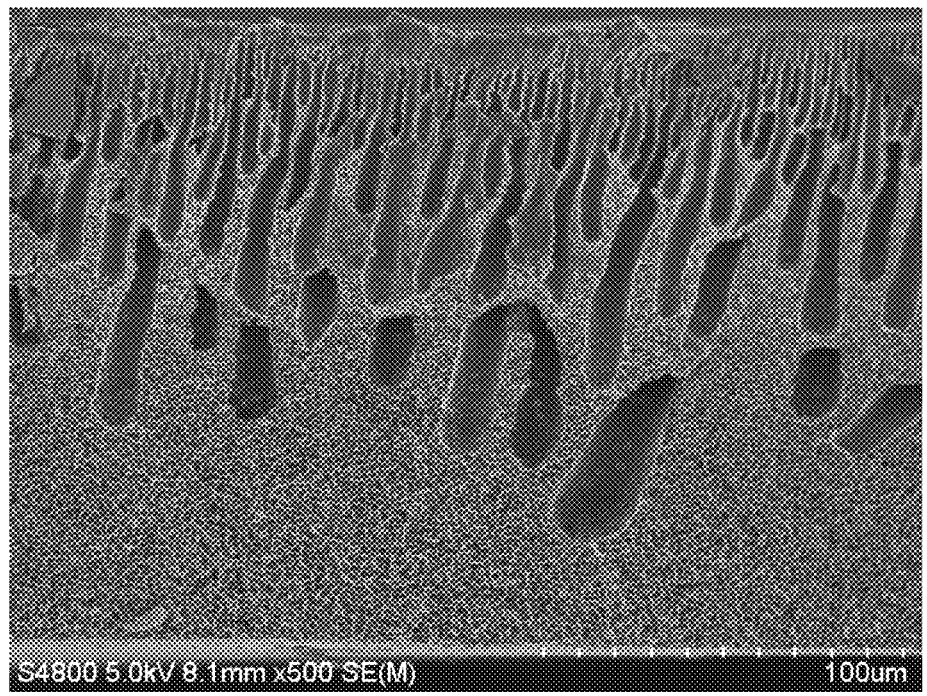
FIG. 12 is a sectional view of a resin composition in Comparative Example 25 outside of the range of the present invention.

The mean porosity size of the porosity was 5.0 µm. The number distribution was examined. Then, 62% of the total porosity was included in a size of 3.5 to 6.5 µm. Moreover, the porosity ratio was 65%, and 84% of the total porosity was the independent porosity. The thickness of the obtained porous film was 140 µm. The cross section of the film was observed with the SEM. Then, the cross section had that illustrated in FIG. 12 (5,000-fold).

Comparative Example 25

A polycarbonate resin composition was produced by the same method as that in Comparative Example 24 except that the temperature of the solidifying solvent (water) was 70° C. The resin viscosity was 8,500 cP.

The mean porosity size of the porosity was 6.0 µm. The number distribution was examined. Then, 81% of the total porosity was included in a size of 4.2 to 7.8 µm. Moreover, the porosity ratio was 64%, and 64% of the total porosity was the independent porosity.

Comparative Example 26

A polycarbonate resin composition was produced by the same method as that in Comparative Example 24 except that the resin concentration was 18% by weight. The resin viscosity was 7,200 cP.

The mean porosity size of the porosity was 5.3 µm. The number distribution was examined. Then, 64% of the total porosity was included in a size of 3.7 to 6.9 µm. Moreover, the porosity ratio was 69%, and 62% of the total porosity was the independent porosity.

In Examples 31 to 34 and Comparative Examples 22 to 26, the thermal conductivity, the compression resistance (ratio of thickness change before and after compression), and the dielectric constant were evaluated according to the criteria as follows. Table 6 shows the evaluation result.

TABLE 6

|  | Porosity size [µm] | Independent porosity | Porosity size distribution | Porosity ratio [%] | Resin viscosity [cP] | Solvent substitution adjustment material | Thermal conductivity | Compression resistance | Dielectric constant (×$10^6$ Hz) |
|---|---|---|---|---|---|---|---|---|---|
| Example 31 | 0.015 | ++ | 82 | 65 | 105000 | — | + | +++ | ++ |
| Example 32 | 0.20 | ++ | 92 | 64 | 108000 | 210 [sec/100 cc] | +++ | +++ | ++ |
| Example 33 | 0.50 | ++ | 82 | 61 | 72000 | — | ++ | ++ | ++ |
| Example 34 | 0.84 | ++ | 82 | 61 | 58000 | — | ++ | ++ | ++ |
| Comparative Example 22 | 2.8 | ++ | 65 | 64 | 7600 | — | + | + | ++ |

TABLE 6-continued

|  | Porosity size [μm] | Independent porosity | Porosity size distribution | Porosity ratio [%] | Resin viscosity [cP] | Solvent substitution adjustment material | Thermal conductivity | Compression resistance | Dielectric constant (×10⁶ Hz) |
|---|---|---|---|---|---|---|---|---|---|
| Comparative Example 23 | 13 | ++ | 82 | 64 | 7600 | 800 [sec/100 cc] | − | + | ++ |
| Comparative Example 24 | 5.0 | + | 62 | 65 | 9000 | — | + | − | ++ |
| Comparative Example 25 | 6.0 | + | 81 | 64 | 8500 | — | + | + | ++ |
| Comparative Example 26 | 5.3 | ++ | 64 | 69 | 7200 | — | + | + | ++ |

(The thermal conductivity λ [W/mK]: +++: $\lambda<0.05$, ++: $0.05 \leq \lambda < 0.075$, +: $0.075 \leq \lambda < 0.1$, and −: $\lambda \geq$ not less than 0.1 [W/mK].)

(The compression resistance: +++=less than 1%, ++=not less than 1% and less than 5%, +=not less than 5% and less than 10%, and −=not less than 10%.)

(The dielectric constant [×10⁶ Hz]: ++: less than 2.5, and −: not less than 2.5.)

From table 6, the porous films shown in Examples 31 to 34 are a film having small deterioration in mechanical properties and a low dielectric constant.

(Evaluation of Film Properties)

A relationship of film properties between the mean porosity size and porosity size distribution was evaluated.

Figure 13:
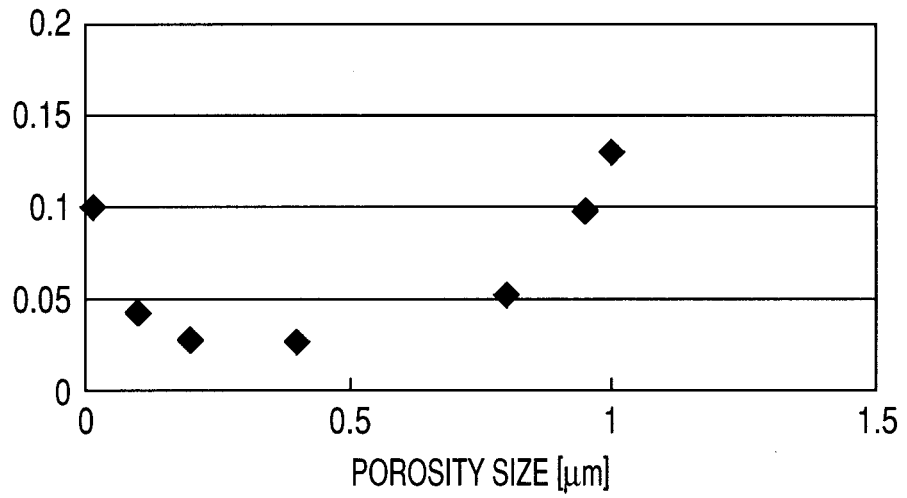
FIG. 13 is a correlation diagram between a porosity size and a thermal conductivity after compression of the resin composition according to the present invention.

The thermal conductivity after compression was used as a film property parameter. FIG. 13 illustrates a correlation between the porosity size of the porous film and the thermal conductivity after compression in the range of the present invention (the porosity size distribution in each correlation is 80%). Here, the porosity size distribution means a proportion of the number of porosities having a porosity size value within ±30% of the mean porosity size based on the total porosity. From FIG. 13, it turned out that the thermal conductivity after compression has the minimum value in a submicron region of the porosity size, and the value of the thermal conductivity is suddenly increased at a porosity size of not less than 1.0 μm.

Figure 14:
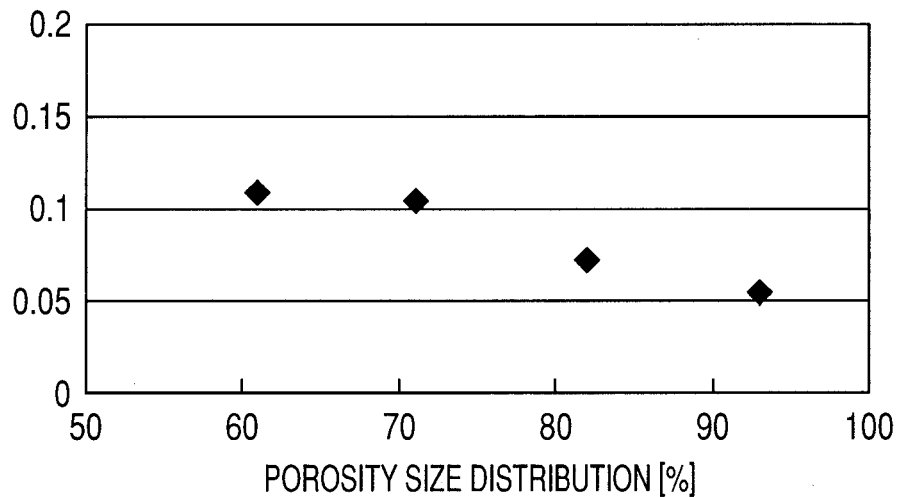
FIG. 14 is a correlation diagram between a porosity size distribution and the thermal conductivity after compression of the resin composition according to the present invention.

Moreover, FIG. 14 illustrates the porosity size distribution of the porous film and the thermal conductivity after compression (the porosity size in each correlation is 0.80 μm). Here, the porosity size distribution in FIG. 14 means a proportion of the number of porosities having a porosity size value within ±30% of the mean porosity size based on the total porosity. From FIG. 14, it turned out that increase in the thermal conductivity after compression is suppressed when not less than 80% of the total porosity has a porosity size within ±30% of the mean porosity size.

From the above-mentioned results, it turned out that the porous film having low thermal conductivity and high compression resistance can be obtained by setting the mean porosity size and porosity size distribution of the porosities in the ranges of the present invention (the mean porosity size is not less than 0.01 μm and not more than 0.9 μm, and not less than 80% of the total porosity has a porosity size within ±30% of the mean porosity size.), and the porous film can be used suitably as a belt material in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japan Patent Application No. 2009-129726 filed on May 28, 2009, and the content thereof is cited as a part of this application.

What is claimed is:

1. A method for producing a resin composition having a porous structure in which 80% to 94% of a total porosity is comprised of independent porosities, the independent porosities having walls having no opening between adjacent porosities, the method comprising:
   molding a resin solution having a viscosity of 10,000 cP to 1,000,000 cP; and
   removing a solvent of the resin solution by a phase separation method to perform porosification,
   wherein the porous structure has a mean porosity size of 0.01 μm to 0.9 μm, and
   wherein not less than 80% of the total porosity has a porosity size within ±30% of the mean porosity size.

2. The method according to claim 1, wherein the resin solution comprises at least one selected from the group consisting of a polyimide, a polyamidoimide, a polyamide, a polyether imide, a polycarbonate, a polyether ether ketone, a polysulfone, and a polyether sulfone.

3. The method according to claim 1, wherein the resin solution contains 1% by weight to 30% by weight based thereon of a conductive controlling agent.

4. The method according to claim 1, wherein the porous structure has a porosity ratio from 10% to 90%.

5. The method according to claim 1, wherein the porous structure has a porosity ratio from 30% to 70%.

6. The method according to claim 1, wherein the porous structure has a porosity ratio from 60% to 70%.

7. The method according to claim 1, wherein the composition includes an inorganic substance that increases viscosity of a precursor of the resin solution.

8. The method according to claim 7, wherein the inorganic substance comprises at least one substance selected from the group consisting of lithium chloride, lithium bromide, and lithium oxalate.

9. The method according to claim 1, wherein the resin composition is a resin film, which is disposed between a substrate and a releasing layer.

10. The method according to claim 9, wherein the releasing layer has a thickness of 1 mm to 10 mm.

11. The method according to claim 9, wherein if the resin film has a macro void, a porosity size thereof is less than 10 μm.

12. The method according to claim 9, wherein the resin film has a thickness of at least 120 μm.

13. The method according to claim 1, wherein the viscosity of the resin solution is 94,000 cP to 500,000 cP.

14. The method according to claim 1, wherein the resin composition has a thermal conductivity of less than 0.1

W/m·K, a compression resistance of less than 10%, and a thermal conductivity after compression of less than 0.1 W/m·K.

15. The method according to claim 1, wherein the resin composition has a thermal conductivity of less than 0.05 W/m·K.

16. The method according to claim 1, wherein not less than 91% of the total porosity has the porosity size within ±30% of the mean porosity size.

17. The method according to claim 1, wherein the phase separation method comprises adjusting a solvent substitution rate.

18. The method according to claim 17, wherein the adjusting of the solvent substitution rate comprises adding a second solvent and a solidifying solvent,
wherein the solidifying solvent is water, and
wherein the second solvent is at least one selected from the group consisting of ethanol, methanol, propanol, acetone, and methyl ethyl ketone.

19. A for producing a resin composition having a porous structure in which 80% to 94% of a total porosity is comprised of independent porosities, the independent porosities having walls having no opening between adjacent porosities, the method comprising:
molding a resin solution having a viscosity of 10,000 cP to 1,000,000 cP; and
removing a solvent of the resin solution by a phase separation method, which comprises adjusting a solvent substitution rate, to perform porosification,
wherein the porous structure has a mean porosity size of 0.01 μm to 0.9 μm,
wherein not less than 80% of the total porosity has a porosity size within ±30% of the mean porosity size,
wherein the adjusting of the solvent substitution rate comprises adding a solidifying solvent and changing a temperature of the solidifying solvent, and
wherein the solidifying solvent is water.

20. The method according to claim 1, wherein the phase separation method comprises adjusting a solidifying rate.

21. A method for producing a resin composition having a porous structure in which 80% to 94% of a total porosity is comprised of independent porosities, the independent porosities having walls having no opening between adjacent porosities, the method comprising:
molding a resin solution having a viscosity of 10,000 cP to 1,000,000 cP; and
removing a solvent of the resin solution by a phase separation method to perform porosification,
wherein the porous structure has a mean porosity size of 0.01 μm to 0.9 μm,
wherein not less than 80% of the total porosity has a porosity size within ±30% of the mean porosity size, and
wherein the phase separation method comprises casting the resin solution on a substrate to form a cast film and covering the cast film with a solvent substitution rate adjustment film.

22. The method according to claim 3, wherein the conductive controlling agent is at least one of carbon black and a metal oxide.

* * * * *